US012462751B2

(12) United States Patent
Sasago et al.

(10) Patent No.: US 12,462,751 B2
(45) Date of Patent: Nov. 4, 2025

(54) LIGHT-EMITTING DEVICE HAVING CONTROL CONNECTION BETWEEN GATE OF DRIVE TRANSISTOR AND POWER SUPPLY, PHOTOELECTRIC CONVERSION DEVICE, ELECTRONIC APPARATUS, LIGHTING DEVICE AND MOVING BODY

(71) Applicant: CANON KABUSHIKI KAISHA, Tokyo (JP)

(72) Inventors: Tomoya Sasago, Kanagawa (JP); Hiromasa Tsuboi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/630,910

(22) Filed: Apr. 9, 2024

(65) Prior Publication Data

US 2024/0339079 A1 Oct. 10, 2024

(30) Foreign Application Priority Data

Apr. 10, 2023 (JP) ................................ 2023-063431

(51) Int. Cl.
*G09G 3/3233* (2016.01)
*G09G 3/3266* (2016.01)
*G09G 3/00* (2006.01)

(52) U.S. Cl.
CPC ......... *G09G 3/3233* (2013.01); *G09G 3/3266* (2013.01); *G09G 3/003* (2013.01);
(Continued)

(58) Field of Classification Search
CPC ... G09G 2300/0819; G09G 2300/0852; G09G 2300/0861; G09G 2310/0291; G09G 2310/066; G09G 2310/08; G09G 2320/0233; G09G 2320/045; G09G 2380/10; G09G 3/003; G09G 3/035;
(Continued)

(56) References Cited

U.S. PATENT DOCUMENTS 11,900,845 B2 * 2/2024 Xiong .................. G09G 3/2003
2008/0001545 A1 * 1/2008 Uchino ................ G09G 3/3233 315/175

(Continued)

FOREIGN PATENT DOCUMENTS

JP 2004341352 A 12/2004
JP 2008241782 A 10/2008

(Continued)

*Primary Examiner* — Richard J Hong
(74) *Attorney, Agent, or Firm* — Canon U.S.A., Inc. IP Division

(57) ABSTRACT

A light-emitting device includes a plurality of light-emitting elements and a plurality of pixel circuits. The plurality of pixel circuits each includes a drive transistor configured to drive a corresponding one of the plurality of light-emitting elements, a write transistor configured to write a signal to a gate of the drive transistor, and a light emission control transistor configured to control connection between the gate of the drive transistor and a power supply. The light-emitting device includes a first control line for controlling the write transistor, a second control line for controlling the light emission control transistor, a first circuit configured to incline a signal waveform of the first control line, and a second circuit configured to incline a signal waveform of the second control line.

19 Claims, 14 Drawing Sheets

(52) U.S. Cl.
CPC ..... *G09G 3/035* (2020.08); *G09G 2300/0819* (2013.01); *G09G 2300/0852* (2013.01); *G09G 2300/0861* (2013.01); *G09G 2310/0291* (2013.01); *G09G 2310/066* (2013.01); *G09G 2310/08* (2013.01); *G09G 2320/0233* (2013.01); *G09G 2320/045* (2013.01); *G09G 2380/10* (2013.01)

(58) Field of Classification Search
CPC .. G09G 3/3233; G09G 3/3266; G09G 3/3258; G09G 3/2003; G09G 3/3426; G06T 13/80
See application file for complete search history.

(56) References Cited

U.S. PATENT DOCUMENTS

| | | | | |
|---|---|---|---|---|
| 2009/0109149 | A1* | 4/2009 | Akimoto .............. | G09G 3/3233 345/76 |
| 2010/0039454 | A1* | 2/2010 | Nakamura ........... | G09G 3/3291 345/690 |
| 2010/0201717 | A1* | 8/2010 | Kato .................... | G09G 3/3233 345/77 |
| 2021/0082357 | A1* | 3/2021 | Xiao .................... | G09G 3/3426 |
| 2023/0095998 | A1* | 3/2023 | Hashikaki ............ | G09G 3/3258 345/204 |
| 2023/0377521 | A1* | 11/2023 | Hashikaki ............ | G09G 3/3258 |

FOREIGN PATENT DOCUMENTS

| | | | |
|---|---|---|---|
| JP | 2008310352 | A | 12/2008 |
| JP | 2021128194 | A | 9/2021 |

* cited by examiner

LIGHT-EMITTING DEVICE HAVING CONTROL CONNECTION BETWEEN GATE OF DRIVE TRANSISTOR AND POWER SUPPLY, PHOTOELECTRIC CONVERSION DEVICE, ELECTRONIC APPARATUS, LIGHTING DEVICE AND MOVING BODY

BACKGROUND OF THE INVENTION

Field of the Invention

One disclosed aspect of the embodiments relates to a light-emitting device, and more particularly to, for example, a light-emitting device including an organic light-emitting element, a photoelectric conversion device, an electronic apparatus, a lighting device and a moving body.

Description of the Related Art

A display device including an organic light-emitting element or the like is used for various applications such as a mobile device, a television set, and a wearable device. If video signals with the same level are supplied to pixels that form a screen, all pixels can emit light at the same luminance, so that uniformity in luminance can be obtained over the screen. However, uniformity in luminance on the screen may be degraded due to a difference in the device characteristics that configure the pixels. Particularly, if there is a demand for a larger screen and an increased number of pixels, ensuring uniformity in luminance on a screen leads to a higher image quality. Accordingly, techniques for ensuring uniformity in luminance over a screen have been developed.

Japanese Patent Application Laid-Open No. 2008-310352 discusses a configuration in which a waveform of a control signal WS to turn off a sampling transistor is inclined to correct the mobility of a drive transistor.

In the configuration discussed in Japanese Patent Application Laid-Open No. 2008-310352, the waveform of the control signal for the sampling transistor is inclined to correct the mobility of the drive transistor. In this configuration, however, control signals for the other transistors have not been considered.

SUMMARY OF THE INVENTION

One embodiment has been made in view of the above-described issues, and is directed to providing a technique that is advantageous in ensuring uniformity in a screen.

According to an aspect of the disclosure, a light-emitting device includes a plurality of light-emitting elements and a plurality of pixel circuits. The plurality of pixel circuits each includes a drive transistor configured to drive a corresponding one of the plurality of light-emitting elements, a write transistor configured to write a signal to a gate of the drive transistor, and a light emission control transistor configured to control connection between the gate of the drive transistor and a power supply. The light-emitting device includes a first control line for controlling the write transistor, a second control line for controlling the light emission control transistor, a first circuit configured to incline a signal waveform of the first control line, and a second circuit configured to incline a signal waveform of the second control line The second circuit inclines a waveform to turn off the light emission control transistor. The first circuit inclines a waveform to turn off the write transistor.

Further features of the disclosure will become apparent from the following description of exemplary embodiments with reference to the attached drawings.

DESCRIPTION OF THE EMBODIMENTS

Figure 1:
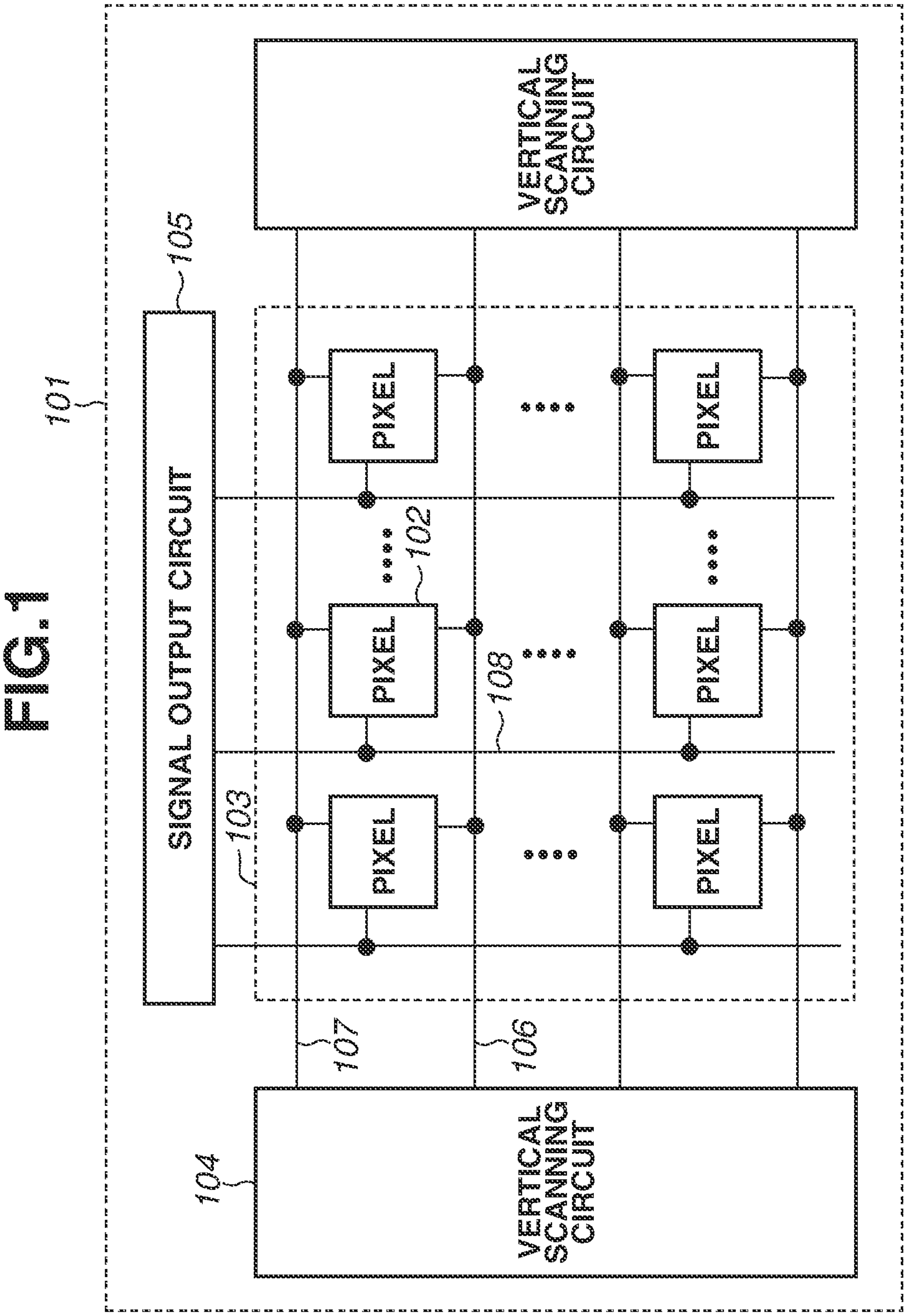
FIG. 1 illustrates a configuration example of a light-emitting device according to a first exemplary embodiment.

Exemplary embodiments will be described in detail below with reference to the accompanying drawings. The following exemplary embodiments are not intended to limit the claimed disclosure. A plurality of features is described in the exemplary embodiments, but not all of these features are essential to the disclosure and these features can be arbitrarily combined. In the accompanying drawings, the same reference numerals are given to the same or similar components, and redundant description thereof is omitted.

(Overall Configuration)

Figure 2:
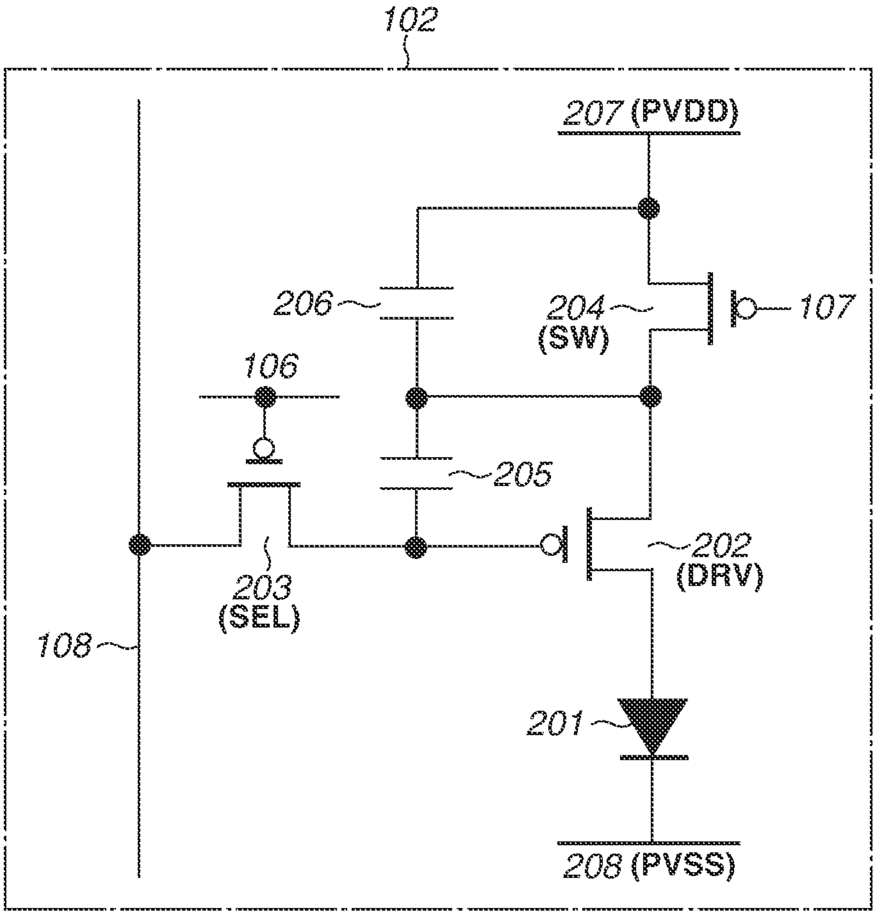
FIG. 2 is a circuit diagram illustrating a pixel circuit of the light-emitting device according to the first exemplary embodiment.

FIG. 1 illustrates a configuration example of a light-emitting device according to a first exemplary embodiment. As illustrated in FIG. 1, a light-emitting device 101 including an organic light-emitting element includes a pixel array unit 103 and driving units located in the vicinity of the pixel array unit 103. The pixel array unit 103 includes a plurality of pixels 102 that are two-dimensionally arranged in a matrix. Each pixel 102 includes an organic light-emitting element 201 (as illustrated in FIG. 2). The organic light-emitting element 201 includes organic layers including a light-emitting layer between an anode electrode and a cathode electrode. The organic layers may include one or more of a hole injection layer, a hole transport layer, an electron injection layer, and an electron transport layer, in addition to the light-emitting layer.

The light-emitting device 101 includes the driving units for driving each pixel 102. For example, the light-emitting device 101 includes vertical scanning circuits 104 and a signal output circuit 105 as the driving units. In the pixel array unit 103, a first control line 106 and a second control line 107 are provided for each row of the pixels 102 along a row direction. A signal line 108 is provided for each column of the pixels 102 along a column direction.

The first control line 106 and the second control line 107 are connected to an output end of the corresponding row of the vertical scanning circuits 104. The signal line 108 is connected to an output end of the signal output circuit 105. The vertical scanning circuits 104 are located on the right and left sides of the pixel array unit 103, and supply a write control signal to each first control line 106 during writing of a video signal to each pixel 102 of the pixel array unit 103. The vertical scanning circuits 104 also supply a light emission control signal for controlling ON and OFF of light emission to each second control line 107.

(Pixel Circuit)

FIG. 2 is a circuit diagram illustrating each pixel 102 included in the light-emitting device 101 illustrated in FIG. 1. As illustrated in FIG. 2, each pixel 102 includes an organic light-emitting element 201, a drive transistor 202 (DRV), a write transistor 203 (SEL), a light emission control transistor 204 (SW), a first capacitor element 205, and a second capacitor element 206. In the present exemplary embodiment, the drive transistor 202, the write transistor 203, and the light emission control transistor 204 are p-type transistors. The first capacitor element 205 and the second capacitor element 206 have, for example, a Metal-Insulator-Metal (MIM) structure.

Specifically, the drain of the drive transistor 202 is connected to the anode of the organic light-emitting element 201. The source of the light emission control transistor 204 is connected to a first power supply 207 (hereinafter referred to as PVDD). The cathode of the organic light-emitting element 201 is connected to a second power supply 208 (hereinafter referred to as PVSS). The gate of the light emission control transistor 204 is connected to the second control line 107.

The drain of the write transistor 203 is connected to the gate of the drive transistor 202, and the source of the write transistor 203 is connected to the signal line 108. The gate of the write transistor 203 is connected to the first control line 106.

The first capacitor element 205 is connected between the gate of the drive transistor 202 and the source of the drive transistor 202. The second capacitor element 206 is connected between the source of the light emission control transistor 204 and the drain of the light emission control transistor 204.

In the light-emitting device 101, a threshold voltage of the drive transistor 202 is different for each pixel due to manufacturing variations. In a case where the same signal voltage is written into a plurality of pixels of the same color, if the threshold voltage of the drive transistor 202 is different for each pixel, a drain current of the drive transistor 202 is also different for each pixel, which causes a variation in the amount of light emission. Accordingly, an operation (a so-called threshold correction operation) for holding the threshold voltage of the drive transistor 202 between the gate and the source of the drive transistor 202 is performed before writing of the signal voltage. This threshold correction operation makes it possible to reduce variations in the amount of current of the drive transistor 202 among the pixels, thereby achieving uniform light emission.

In the threshold correction operation, first, a current is caused to flow to the organic light-emitting element 201 via the light emission control transistor 204 and the drive transistor 202 during a period in which the write transistor 203 and light emission control transistor 204 are in an ON state. Next, the light emission control transistor 204 is turned off and an on-current of the drive transistor 202 causes electric charges held in the first capacitor element 205 to flow out, so that the voltage between the gate and the source of the drive transistor 202 decreases toward the threshold voltage. Thus, the threshold correction operation is performed. When the write transistor 203 is turned off, the threshold correction operation ends. The voltage between the gate and the source of the drive transistor 202 varies depending on a threshold correction period. Accordingly, it is important to set the same threshold correction period for each pixel. This operation will be described in detail below.

(Scanning Circuit and Control Signal)

Figure 3A:
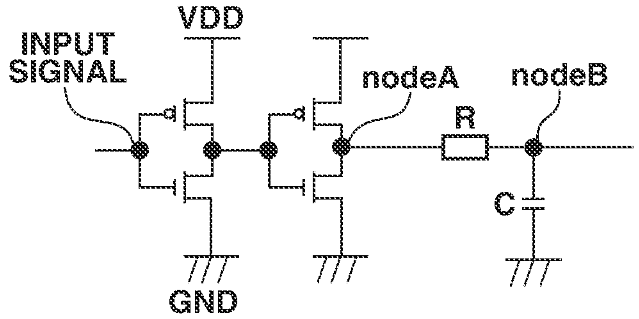
FIGS. 3A to 3C are circuit diagrams illustrating an equivalent circuit of a scanning line according to the first exemplary embodiment.
Figure 3B:
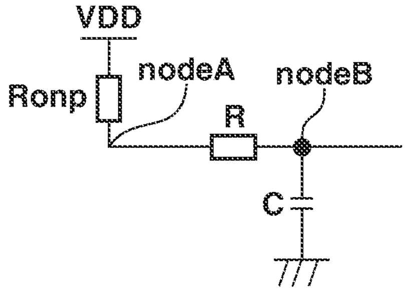
Figure 3C:
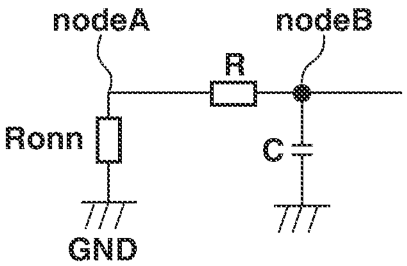
Figure 3D:
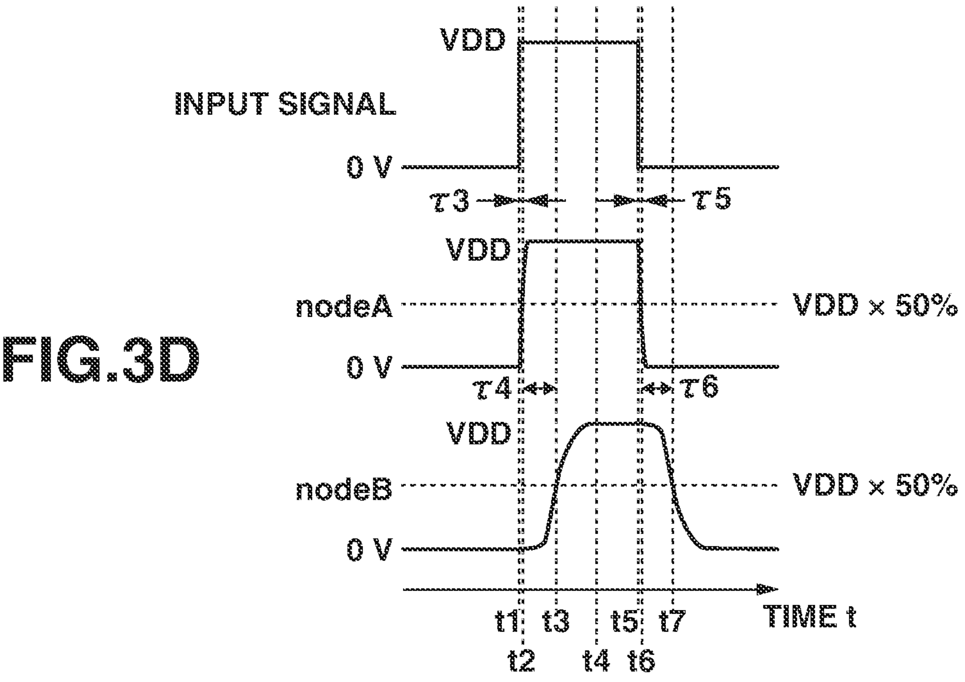
FIG. 3D is a timing diagram illustrating a relationship between a control signal and time.

FIGS. 3A to 3C are circuit diagrams each schematically illustrating an equivalent circuit of a scanning line, and FIG. 3D is a timing diagram schematically illustrating a relationship between a control signal and time.

FIG. 3A illustrates a buffer of each vertical scanning circuit 104 and an equivalent circuit of a scanning line. FIG. 3B illustrates an equivalent circuit in a logical state when the output of the buffer transitions from a low level to a high level. FIG. 3C illustrates an equivalent circuit in a logical state when the output of the buffer transitions from the high level to the low level.

In a configuration example illustrated in FIG. 3A, an input signal is input to an inverter constituting the buffer of each vertical scanning circuit 104, and the buffered signal is supplied to the scanning line. Assume herein that a time for the control signal to reach 50% of VDD from 0 V or to reach 50% of VDD from VDD is set as a delay amount. When the output of the buffer transitions from the low level to the high level, the delay amount is affected by an on-resistance of a p-type transistor (transistor of a first conductivity type) of the inverter constituting the buffer. On the other hand, when the output of the buffer transitions from the high level to the low level, the delay amount is affected by an on-resistance of an n-type transistor (transistor of a second conductivity type) of the inverter constituting the buffer.

Next, configuration examples will be described with reference to FIGS. 3B and 3C. Assume herein that "Ronp" represents the on-resistance of the p-type transistor constituting the buffer of each vertical scanning circuit 104, "Ronn" represents the on-resistance of the n-type transistor constituting the buffer of each vertical scanning circuit 104, "R" represents a wiring resistance of the scanning line, and "C" represents a parasitic capacitance of the scanning line. In this case, a delay amount τ1 of the control signal at a timing of a rising edge of the control signal when the p-type transistor is in the ON state is represented by the following equation.

$$\tau 1 = (Rpon + R) \times C$$

A delay amount τ2 of the control signal at a timing of a rising edge of the control signal when the n-type transistor is in the ON-state is represented by the following equation.

$$\tau 2=(Rnon+R)\times C$$

Assuming that "L" represents the wiring length of the scanning line, "r" represents the resistance per unit length, and "c" represents the capacitance per unit length, a delay amount τ1' of the control signal at a timing of a rising edge of the control signal when the p-type transistor is in the ON state is represented by the following equation.

$$\tau 1'=(Rpon+r\times L)\times c\times L$$

A delay amount τ2' of the control signal at a timing of a rising edge of the control signal when the n-type transistor is in the ON state is represented by the following equation.

$$\tau 2'=(Rnon+r\times L)\times c\times L$$

As seen from the above equations, the delay amount increases as the wiring length L increases. As the delay amount increases, a rising edge or a falling edge of a waveform is inclined. The term "incline" means to slope, tilt, or lean in a direction of the rising edge or the falling edge. Accordingly, in the process of propagation through the scanning line, the slope of a rising edge or a falling edge of the control signal becomes gentler toward a central portion of the pixel array unit 103 from an end portion of the pixel array unit 103. The gentle here means that the slope or the incline does not exceed 15% of the period. The period here means a time during which a signal voltage is applied.

FIG. 3D illustrates the input signal to be input to the buffer and the waveform of the control signal when an end portion of the pixel array unit 103 is set as a node A and a central portion of the pixel array unit 103 is set as a node B. The end portion of the pixel array unit 103 refers to the end of the pixel array unit 103 that is closest to the corresponding vertical scanning circuit 104.

The central portion of the pixel array unit 103 refers to the center of the pixel array unit 103 that is farthest from the vertical scanning circuits 104 located on the right and left sides. If the vertical scanning circuit 104 is located on one of the right and left sides, the "end portion" indicates a first end portion (e.g., a left-side end portion), and the "central portion" indicates a second end portion (e.g., a right-side end portion) located on the opposite side of the first end portion.

At time t1 illustrated in FIG. 3D, the input signal rises.

At time t2, the waveform of the node A reaches a voltage of about 50% of VDD from 0 V. A period from time t1 to time t2 corresponds to a delay amount τ3 in the node A.

At time t3, the waveform of the node B reaches a voltage of about 50% of VDD from 0 V. A period from time t1 to time t3 corresponds to a delay amount τ4 in the node B. The delay amount in the waveform of the node B corresponding to the central portion of the pixel array unit 103 is larger than the delay amount in the waveform of the node A corresponding to the end portion of the pixel array unit 103. This is because the wiring length L in the central portion of the pixel array unit 103 is longer than the wiring length L in the end portion of the pixel array unit 103.

At time t5, the input signal falls.

At time t6, the waveform of the node A reaches a voltage of about 50% of VDD from VDD. A period from time t5 to time t6 corresponds to a delay amount τ5 in the node A.

At time t7, the waveform of the node B reaches a voltage of about 50% of VDD from 0 V. A period from time t5 to time t7 corresponds to a delay amount τ6 in the node B. The delay amount in the waveform of the node B corresponding to the central portion of the pixel array unit 103 is larger than the delay amount in the waveform of the node A corresponding to the end portion of the pixel array unit 103.

Generally, in the case of buffering a control signal, the signal quality increases as the on-resistance of each of the p-type transistor and the n-type transistor is decreased to reduce the delay amount of the control signal. However, the present exemplary embodiment provides a configuration in which a rising edge or/and a falling edge of a waveform in the end portion of the pixel array unit 103 is inclined. For example, the on-resistance of the p-type transistor or the n-type transistor is increased. Alternatively, for example, a resistor element can be disposed between the node A and the end portion of the pixel array unit 103. With this configuration, the difference in the slope of the rising edge or the falling edge of the waveform between the end portion and the central portion of the pixel array unit 103 can be reduced. The on-resistance of only one of the p-type transistor and the n-type transistor can be increased. If the on-resistance of the p-type transistor is increased, the rising edge of the waveform in the end portion of the pixel array unit 103 can be inclined. If the on-resistance of the n-type transistor is increased, the falling edge of the waveform in the end portion of the pixel array unit 103 can be inclined.

(Scanning Circuit: Control Signal of Write Transistor)

Figure 4:
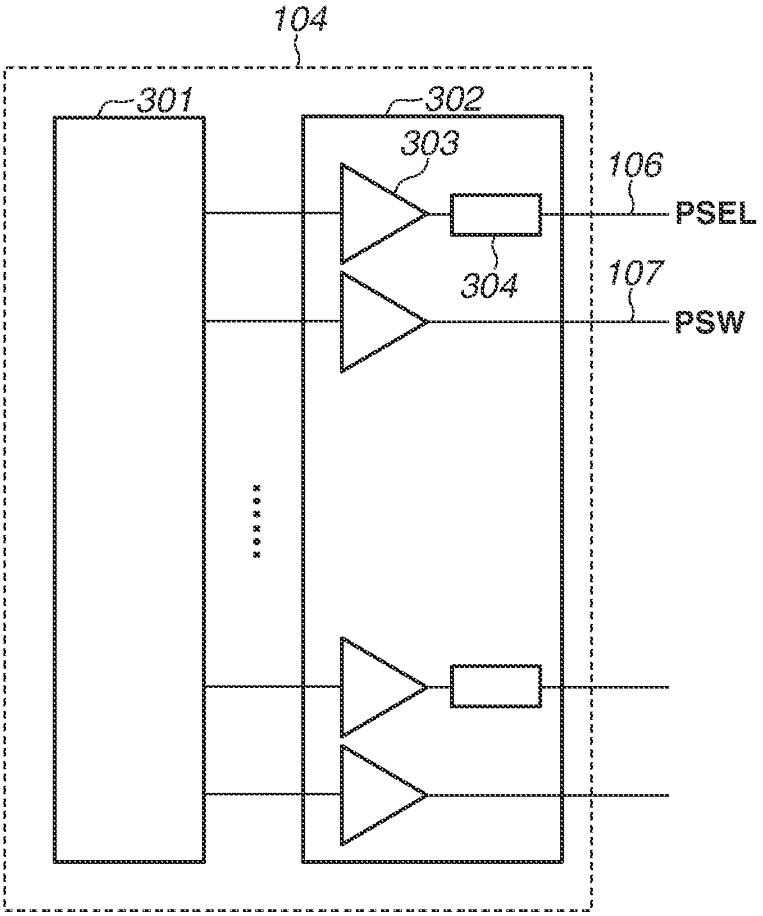
FIG. 4 illustrates a configuration example of a vertical scanning circuit according to the first exemplary embodiment.

FIG. 4 illustrates a configuration example of each vertical scanning circuit 104 according to the present exemplary embodiment. Specifically, FIG. 4 illustrates a configuration example for inclining a waveform of a signal to be input to the write transistor 203.

The vertical scanning circuit 104 includes a write/light emission scanning circuit 301 and a pixel control signal output circuit 302. The write/light emission scanning circuit 301 includes an output for each row. Write rows and light emission rows are selected in a row-sequential manner. The pixel control signal output circuit 302 outputs the write control signal via the first control line 106 based on the output of the write/light emission scanning circuit 301. Further, the pixel control signal output circuit 302 outputs the light emission control signal via the second control line 107 based on the output of the write/light emission scanning circuit 301. The pixel control signal output circuit 302 includes an output buffer 303 and a resistor element 304 for each row. The output buffer 303 buffers the signals to be supplied to the first control line 106 and second control line 107. The resistor element 304 is located between the output buffer 303 and the first control line 106.

The provision of the resistor element 304 makes it possible to supply a waveform with a large delay amount in a rising edge and a falling edge in the end portion of the pixel array unit 103 in advance, unlike in the case where the resistor element 304 is not provided. As a result, the adverse effect of an increase in the delay amount due to an increase in the wiring length L is relatively decreased, so that variations in the slope of the rising edge and the falling edge of the waveform generated in the propagation process can be reduced. Therefore, the difference in the slope of the rising edge and the falling edge of the waveform between the end portion and the central portion of the pixel array unit 103 can be reduced.

While, in the present exemplary embodiment described above, an example where the waveform of the control signal to be input to the write transistor 203 is inclined is described, the present exemplary embodiment can also be applied to a configuration in which the waveform of the control signal to be input to the light emission control transistor 204 is inclined.

(Scanning Circuit: Control Signal of Light Emission Control Transistor)

Figure 5:
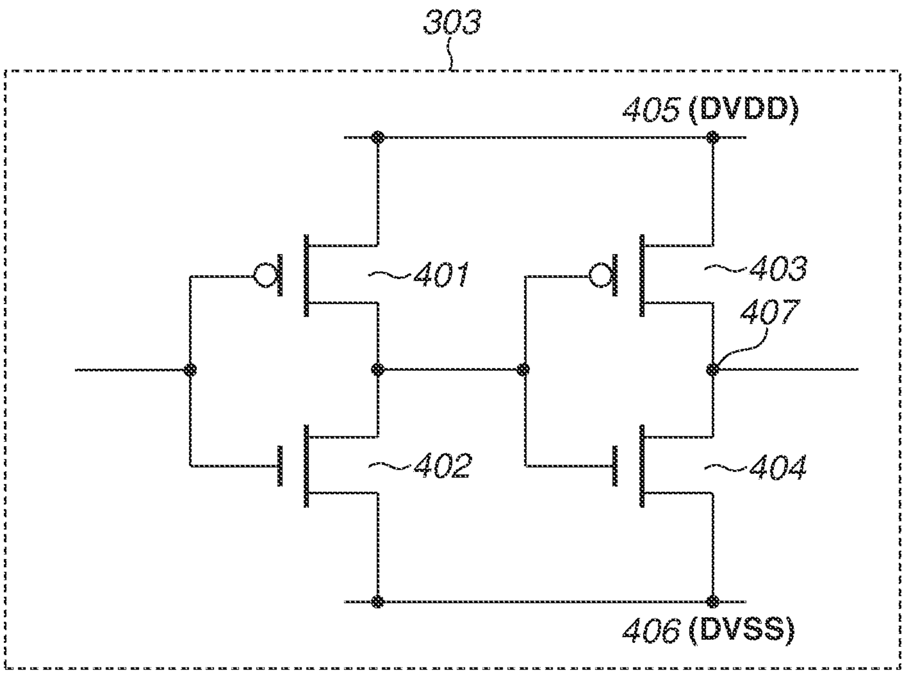
FIG. 5 illustrates a configuration example of an output buffer according to the first exemplary embodiment.

FIG. 5 is a circuit diagram illustrating a configuration example of the output buffer 303 according to the present exemplary embodiment. Specifically, FIG. 5 illustrates a configuration example for inclining a rising edge of a waveform of the control signal to be input to the light emission control transistor 204.

As illustrated in FIG. 5, the output buffer 303 is composed of a two-stage inverter and includes p-type transistors 401 and 403 and n-type transistors 402 and 404. The source of each of the p-type transistors 401 and 403 is connected to a third power supply 405 (hereinafter referred to as DVDD). The source of each of the n-type transistors 402 and 404 is connected to a fourth power supply 406 (hereinafter referred to as DVSS). An output terminal 407 is supplied with an output signal from the output buffer 303, and is connected to each of the drain of the p-type transistor 403 and the drain of the n-type transistor 404.

The on-resistance of the p-type transistor 403 is set to be higher than the on-resistance of the n-type transistor 404. The mobility of holes is generally lower than the mobility of electrons. Accordingly, for example, if the n-type transistor and the p-type transistor have the same size, the driving capability of the p-type transistor is smaller than the driving capability of the n-type transistor, and thus the on-resistance of the p-type transistor is higher than the on-resistance of the n-type transistor. In this case, the size of each transistor is represented as a ratio W/L of a channel width W to a channel length L. For example, assume that “Lp” represents the channel length of the p-type transistor, “Wp” represents the channel width of the p-type transistor, “Ln” represents the channel length of the n-type transistor, and “Wn” represents the channel width of the n-type transistor. In this case, it may be desirable to satisfy at least the condition that Wn/Ln is more than or equal to Wp/Lp so that the on-resistance of the p-type transistor 403 is set to be higher than the on-resistance of the n-type transistor 404. The resistance of the p-type transistor may be set to be higher than the resistance of the n-type transistor by increasing the resistance from the drain of the p-type transistor 404 to the output terminal 407 as compared with the resistance of the n-type transistor 403.

The slope of the rising edge of the control signal can be made gentler, or less inclining than the slope of the falling edge of the control signal by setting the on-resistance of the p-type transistor 403 to be higher than the on-resistance of the n-type transistor 404. The “gentler” may mean leaning toward for at most 15% of the period.

While in the present exemplary embodiment described above, an example where the waveform of the control signal to be input to the light emission control transistor 204 is inclined is described, the present exemplary embodiment can also be applied to a configuration in which the waveform of the control signal to be input to the write transistor 203 is inclined.

(Timing Diagram)

Figure 6:
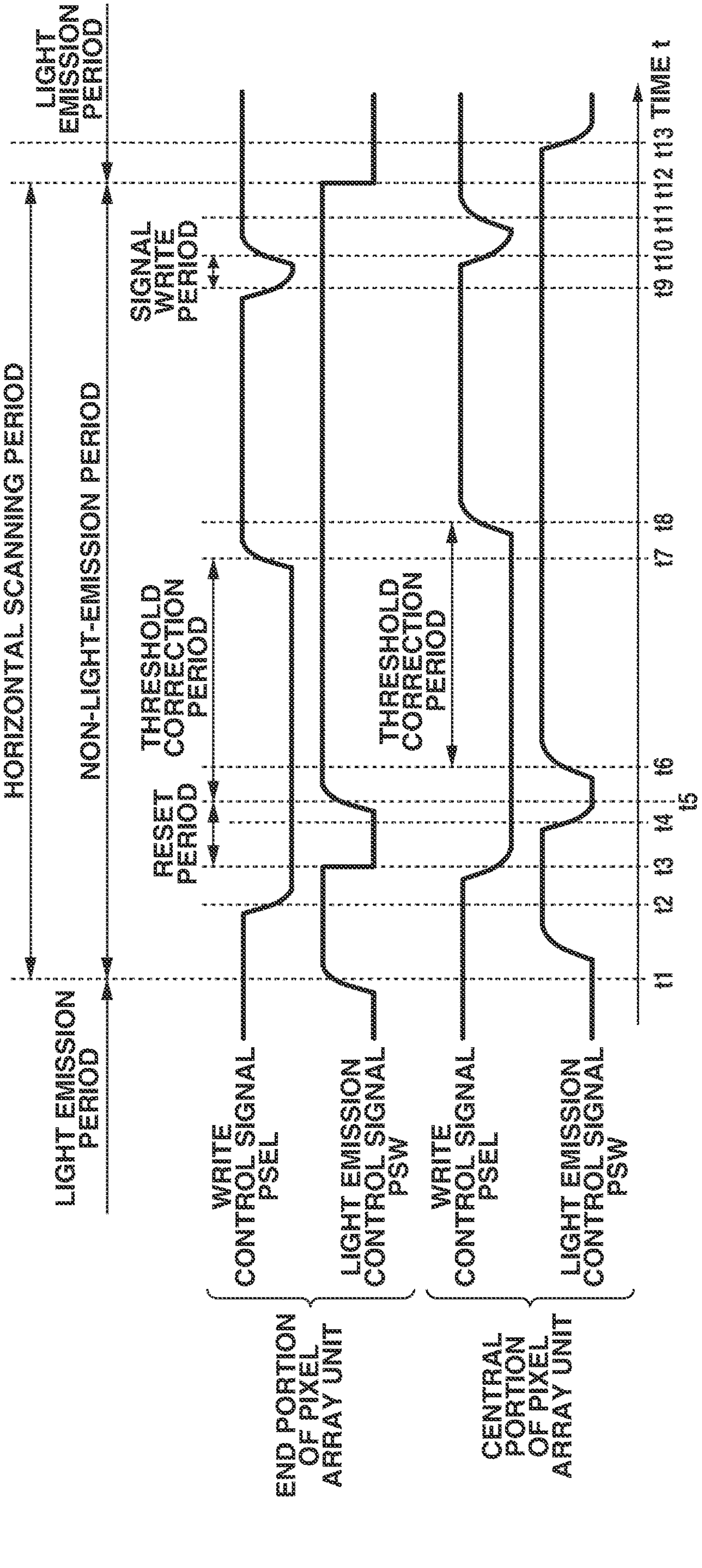
FIG. 6 is a timing diagram of a pixel circuit according to the first exemplary embodiment.

A circuit operation of the light-emitting device 101 according to the first exemplary embodiment will be described with reference to a timing diagram of FIG. 6. The timing diagram of FIG. 6 illustrates a write control signal PSEL and a light emission control signal PSW in each of the end portion and the central portion of the pixel array unit 103. As described above, the central portion refers to the control signal for the pixel that is farthest from the vertical scanning circuits 104.

Hereinafter, assume that a period from time t1 to time t12 corresponds to a non-light-emission period, and a period after time t12 corresponds to a light emission period.

(Light Emission Period in Previous Frame)

A period before time t1 corresponds to the light emission period of the organic light-emitting element 201 in a previous horizontal scanning period. In the light emission period, the light emission control transistor 204 is in an ON state and the write transistor 203 is in an OFF state.

(Non-Light-Emission Period in Current Frame)

A period from time t1 corresponds to a new horizontal scanning period. At time t1, the light emission control signal PSW in the end portion of the pixel array unit 103 transitions from the low level to the high level, thereby turning off the light emission control transistor 204 in the end portion of the pixel array unit 103. Thus, no current is supplied from the PVDD 207 to the organic light-emitting element 201 via the light emission control transistor 204 and the drive transistor 202, so that the organic light-emitting element 201 is in a non-light-emission state. After a lapse of a certain period from time t1, the signal voltage of the signal line 108 is changed from Vsig to a threshold correction voltage (hereinafter referred to as Vofs).

At time t2, the write control signal PSEL in the end portion of the pixel array unit 103 transitions from the high level to the low level, thereby turning on the write transistor 203 in the end portion of the pixel array unit 103. Thus, the voltage Vofs of the signal line 108 is written into the gate of the drive transistor 202. Further, since the light emission control transistor 204 is maintained in the OFF state, the source voltage of the drive transistor 202 is in a floating state. Accordingly, the source voltage of the drive transistor 202 is affected by capacitive coupling between the gate and the source of the drive transistor 202, and the source potential varies in the same direction along with the variation in gate potential.

(Reset Period)

At time t3, the light emission control signal PSW in the end portion of the pixel array unit 103 transitions from the high level to the low level, thereby turning on the light emission control transistor 204 in the end portion of the pixel array unit 103. Thus, the source voltage of the drive transistor 202 is substantially equal to that of the PVDD 207. In this case, the gate potential of the drive transistor 202 is set to Vofs and the source potential is set to the PVDD 207. This operation is an initialization operation and corresponds to a reset period. In the reset period, a current is supplied to the organic light-emitting element 201 from the PVDD 207 via the light emission control transistor 204 and the drive transistor 202. Accordingly, an anode potential (hereinafter referred to as Vel) increases as the anode of the organic light-emitting element 201 is charged. In this case, the potential Vel may be desirably less than a light emission threshold for the organic light-emitting element 201. However, the potential Vel is not limited only to this potential, because if the reset period is sufficiently short, the amount of light emission is sufficiently small. A switching transistor may be provided between the organic light-emitting element 201 and the drive transistor 202 and a current may be discharged to a predetermined power supply line via the switching transistor.

At time t4, the light emission control signal PSW in the central portion of the pixel array unit 103 transitions from the high level to the low level, thereby turning on the light emission control transistor 204 in the central portion of the pixel array unit 103.

At times t3 and t4, when the waveform of the light emission control signal PSW is focused, the delay amount of the signal in the central portion of the pixel array unit 103 is larger than that in the end portion of the pixel array unit 103, and the slope of the falling edge is gentle. This is because a unit for inclining the slope of a falling edge of the signal is not provided in the end portion of the pixel array unit 103. In other words, a relative effect on the delay amount due to the wiring resistance and the parasitic capacitance of the scanning line in the central portion of the pixel array unit 103 is larger than that in the end portion of the pixel array unit 103, so that a variation in the slope of the falling edge in the central portion of the pixel array unit 103 is larger than that in the end portion of the pixel array unit 103.

(Start of Threshold Correction Period)

At time t5, the light emission control signal PSW in the end portion of the pixel array unit 103 transitions from the low level to the high level, thereby turning off the light emission control transistor 204 in the end portion of the pixel array unit 103. Thus, the source potential (hereinafter referred to as Vs) of the drive transistor 202 changes to a difference voltage (Vs=Vofs−Vth) between Vofs and the threshold voltage (hereinafter referred to as Vth) of the drive transistor 202. The gate voltage (hereinafter referred to as Vg) of the drive transistor 202 satisfies Vg=Vofs, and thus Vth is held in the first capacitor element 205.

At time t6, the light emission control signal PSW in the central portion of the pixel array unit 103 transitions from the low level to the high level, thereby turning off the light emission control transistor 204 in the central portion of the pixel array unit 103.

At times t5 and t6, it can be seen that there is almost no change in the slope of the rising edge of the waveform of the light emission control signal PSW in the central portion of the pixel array unit 103 as compared with the slope of the rising edge of the waveform of the light emission control signal PSW in the end portion of the pixel array unit 103. This is because the light emission control signal PSW is supplied to the scanning line in a state where the slope of the rising edge of the light emission control signal PSW is preliminarily made gentle in the end portion of the pixel array unit 103. In other words, a relative effect on the delay amount due to the wiring resistance and the parasitic capacitance of the scanning line in the central portion of the pixel array unit 103 is smaller than that in the end portion of the pixel array unit 103, and a variation in the slope of the rising edge in the central portion of the pixel array unit 103 is smaller than that in the end portion of the pixel array unit 103.

(End of Threshold Correction Period)

At time t7, the write control signal PSEL in the end portion of the pixel array unit 103 transitions from the low level to the high level, thereby turning off the write transistor 203 in the end portion of the pixel array unit 103.

A period from time t5 to time t7 corresponds to the threshold correction period in the end portion of the pixel array unit 103. The light emission control transistor 204 and the first capacitor element 205 each function as a threshold correction unit that compensates for the threshold voltage Vth of the drive transistor 202.

At time t8, the write control signal PSEL in the central portion of the pixel array unit 103 transitions from the low level to the high level, thereby turning off the write transistor 203 in the central portion of the pixel array unit 103.

A period from time t6 to time t8 corresponds to the threshold correction period in the central portion of the pixel array unit 103.

At times t7 and t8, it can be seen that there is almost no change in the slope of the rising edge of the waveform of the write control signal PSEL in the central portion of the pixel array unit 103 compared with the slope of the rising edge of the waveform of the light emission control signal PSW in the end portion of the pixel array unit 103. This is because the write signal PSEL is supplied to the scanning line in a state where the rising edge of the write signal PSEL is inclined in the end portion of the pixel array unit 103. In other words, a relative effect on the delay amount due to the wiring resistance and the parasitic capacitance of the scanning line in the central portion of the pixel array unit 103 is smaller than that in the end portion of the pixel array unit 103, and a variation in the slope of the rising edge in the central portion of the pixel array unit 103 is smaller than that in the end portion of the pixel array unit 103.

Thus, the difference in time for the transistors constituting each pixel 102 to be turned off between the end portion and the central portion of the pixel array unit 103 can be reduced by reducing the difference in the slope of the rising edge of the waveform between the end portion and the central portion of the pixel array unit 103. This configuration makes it possible to reduce the difference in the period from when the light emission control transistor 204 is turned off to when the write transistor 203 is turned off, that is, the "threshold correction period", between the end portion and the central portion of the pixel array unit 103. Therefore, the difference in the voltage between the gate and the source of the drive transistor 202 between the end portion and the central portion of the pixel array unit 103 can be reduced. Consequently, uniform light emission of the organic light-emitting element 201 can be achieved and the occurrence of luminance shading in the horizontal direction can be prevented.

(Signal Write Period)

After a lapse of a certain period from time t8, the signal voltage of the signal line 108 changes from Vofs to Vsig.

At time t9, the write control signal PSEL in the end portion of the pixel array unit 103 transitions from the high level to the low level, thereby turning on the write transistor 203 in the end portion of the pixel array unit 103. Thus, the signal voltage Vsig of the signal line 108 is written into the gate of the drive transistor 202. Further, since the source voltage of the drive transistor 202 is in the floating state, the source potential of the drive transistor 202 varies in the same direction along with the variation in the gate potential due to the effect of capacitive coupling between the gate and the source of the drive transistor 202. The source voltage Vs of the drive transistor 202 satisfies Vs=Vofs−Vth+ΔVs where "ΔVs" represents the variation of the source voltage Vs. At time t10, the write control signal PSEL in the end portion of the pixel array unit 103 transitions from the low level to the high level, thereby turning off the write transistor 203 in the end portion of the pixel array unit 103.

A period from time t9 to time t10 corresponds to a signal write period in which the gate voltage of the drive transistor 202 in the end portion of the pixel array unit 103 is set to the signal voltage Vsig.

At time t11, the write control signal PSEL in the central portion of the pixel array unit 103 transitions from the low level to the high level, thereby turning off the write transistor 203 in the central portion of the pixel array unit 103.

At times t10 and t11, it can be seen that there is almost no change in the slope of the rising edge of the waveform of the write control signal PSEL in the central portion of the pixel array unit 103 compared with the slope of the rising edge of the waveform of the write control signal PSEL in the end portion of the pixel array unit 103.

When the write transistor 203 is in the OFF state, electric charges induced in an inversion layer immediately below a channel of the write transistor 203 are distributed to the source and the drain of the write transistor 203. As a result, the gate potential of the drive transistor 202 connected to the drain of the write transistor 203 varies. This phenomenon is called “charge injection”. The variation amount of the gate potential of the drive transistor 202 due to charge injection varies depending on the rising edge of the waveform of the write control signal PSEL. Accordingly, the difference in the voltage between the gate and the source of the drive transistor 202 due to charge injection can be reduced by reducing the difference in the slope of the rising edge of the write control signal PSEL between the end portion and the central portion of the pixel array unit 103. Consequently, uniform light emission of the organic light-emitting element 201 can be achieved and the occurrence of luminance shading in the horizontal direction can be prevented.

(Light Emission Period in Current Frame)

At time t12, the light emission control signal PSW in the end portion of the pixel array unit 103 transitions from the high level to the low level, thereby turning on the light emission control transistor 204 in the end portion of the pixel array unit 103. In this case, the source voltage of the drive transistor 202 is substantially equal to that of the PVDD 207. Then, a current is supplied to the organic light-emitting element 201 from the PVDD 207 via the light emission control transistor 204 and the drive transistor 202, and the organic light-emitting element 201 emits light. The gate voltage of the drive transistor 202 varies due to the effect of capacitive coupling between the gate and the source and between the gate and the drain. The gate voltage Vg of the drive transistor 202 satisfies $Vg=Vsig+\Delta Vg$ where “$\Delta Vg$” represents the variation of the gate voltage Vg.

At time t13, the light emission control signal PSW in the central portion of the pixel array unit 103 transitions from the high level to the low level, thereby turning on the light emission control transistor 204 in the central portion of the pixel array unit 103.

At times t12 and t13, it can be seen that the slope of the falling edge of the waveform of the light emission control signal PSW in the central portion of the pixel array unit 103 is much gentler than the slope of the falling edge of the waveform of the light emission control signal PSW in the end portion of the pixel array unit 103. A timing when the light emission control transistor 204 is turned on can be shifted by making the slope of the falling edge of the light emission control signal PSW in the central portion of the pixel array unit 103 gentler than the slope of the falling edge of the light emission control signal PSW in the end portion of the pixel array unit 103.

(Effect of Present Exemplary Embodiment: Prevention of Variation in Threshold Correction Period)

In the present exemplary embodiment, the on-resistance of the p-type transistor is set to be higher than the on-resistance of the n-type transistor and the resistor element 304 located between the output buffer 303 and the first control line 106. Accordingly, the write control signal PSEL and the light emission control signal PSW are supplied to the scanning line in a state where the rising edge of the waveform of each of the write control signal PSEL and the light emission control signal PSW is inclined in the end portion of the pixel array unit 103. As a result, the difference in the slope of the rising edge of each of the write control signal PSEL and the light emission control signal PSW between the end portion and the central portion of the pixel array unit 103 can be reduced. This configuration makes it possible to reduce the difference in the threshold correction period between the end portion and the central portion of the pixel array unit 103. Consequently, uniform light emission of the organic light-emitting element 201 can be achieved and the occurrence of luminance shading in the horizontal direction can be prevented.

In the light-emitting device 101, the on-resistance and the resistance element of each transistor and the wiring resistance and the parasitic capacitance of the scanning line may be different for each light-emitting device due to manufacturing variations. The threshold correction period varies even when the slope of the rising edge or the falling edge of the write control signal PSEL is optimized to set the same threshold correction period in the end portion and the central portion of the pixel array unit 103. Accordingly, the resistor element 304 may be provided with a plurality of elements with different resistance values, and may be configured to select a certain resistance value from among the plurality of resistance values.

As described above, in the light-emitting device 101 according to the first exemplary embodiment, the resistor element 304 is located between the output buffer 303 and the first control line 106, thereby inclining the write control signal PSEL in the end portion of the pixel array unit 103. Thus, the difference in time for the write transistor 203 to be turned off between the end portion and the central portion of the pixel array unit 103 can be reduced. Further, the on-resistance of the p-type transistor 403 of the output buffer 303 is increased so as to incline the waveform of the light emission control signal PSW in the end portion of the pixel array unit 103. Thus, the difference in time for the light emission control transistor 204 to be turned off between the end portion and the central portion of the pixel array unit 103 can be reduced. With the configurations described above, the difference in the threshold correction period from when the light emission control transistor 204 is turned off to when the write transistor 203 is turned off between the end portion and the central portion of the pixel array unit 103 can be reduced, and the occurrence of luminance shading in the horizontal direction can be prevented.

At the start of the light emission period, electric charges are supplied to the parasitic capacitance of the anode of the organic light-emitting element 201 at the moment when the light emission control transistor 204 is turned on. Accordingly, there is a possibility that a current larger than a current flowing in the steady light-emitting state of the organic light-emitting element 201 can instantaneously flow to the anode of the organic light-emitting element 201 from the PVDD. Therefore, the timing of the instantaneous flow of the large current can be shifted for each pixel by shifting the timing when the light emission control transistor 204 is turned on. A voltage drop in the PVDD can be mitigated by distributing the current, and the difference in the light emission luminance of the organic light-emitting element 201 at the moment when the light emission control transistor 204 is turned on between the end portion and the central portion of the pixel array unit 103 can be reduced. That is, based on this viewpoint, it may be desirable to shift the timing when the light emission control transistor 204 is turned on from the end portion to the central portion of the pixel array unit 103 by changing the slope of the falling edge of the light emission control signal PSW in the central portion of the pixel array unit 103, rather than in the end portion of the pixel array unit 103. Thus, it may be desirable not to actively incline the falling edge of the signal to turn on the light emission control transistor 204. For this reason, the configuration in which only the rising edge of the signal is delayed is employed in the exemplary embodiment described above. According to this configuration, it is possible to reduce adverse effects on the image quality due to an instantaneous current-resistance (iR) drop in the PVDD when the organic light-emitting element 201 is brought into the light-emitting state.

Figure 7:
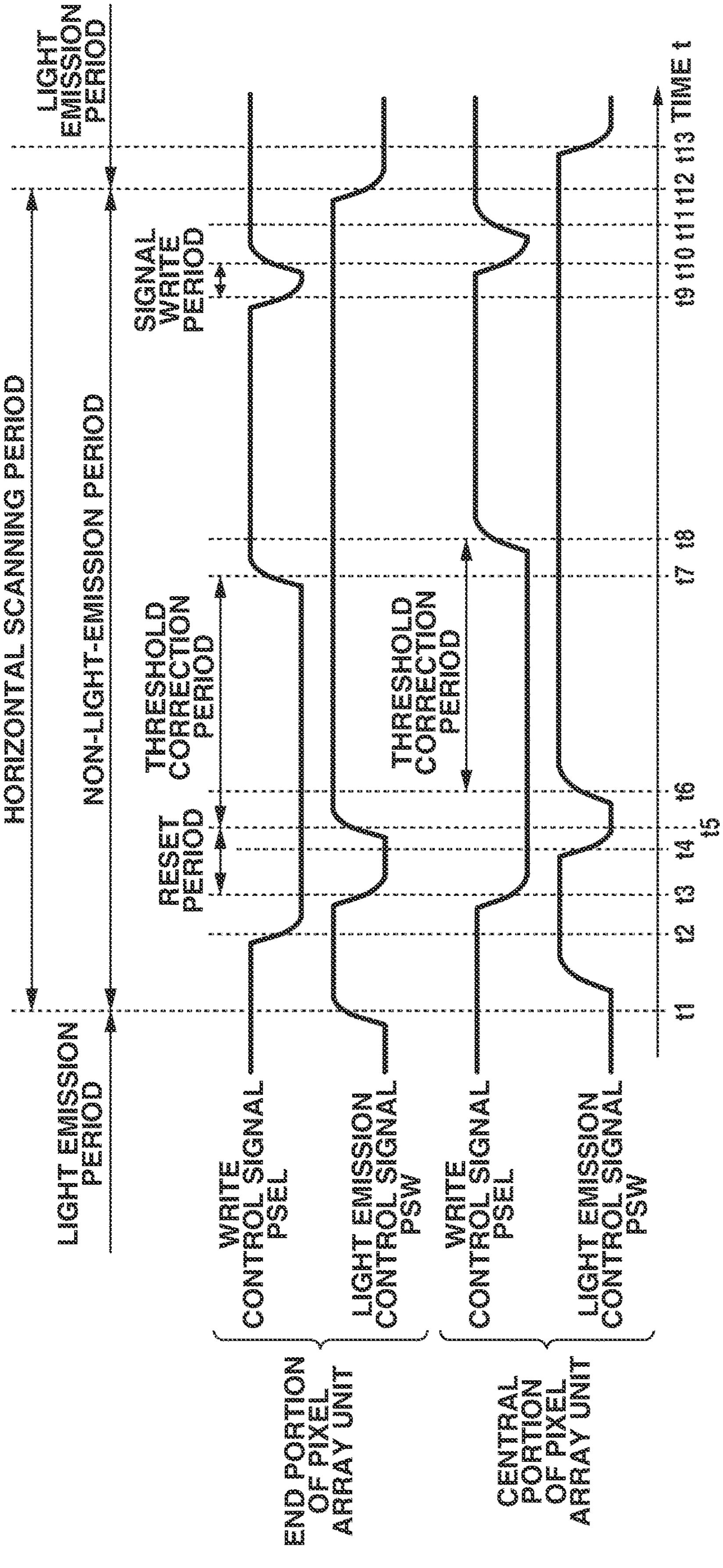
FIG. 7 is a timing diagram of a pixel circuit according to a second exemplary embodiment.

A circuit operation of the light-emitting device 101 according to a second exemplary embodiment will be described with reference to a timing diagram of FIG. 7. In the first exemplary embodiment, a unit for inclining a falling edge of the light emission control signal PSW is not provided, while in the second exemplary embodiment, the unit for inclining a falling edge of the light emission control signal PSW is provided.

At time t12, the light emission control signal PSW in the end portion of the pixel array unit 103 transitions from the high level to the low level, thereby turning on the light emission control transistor 204 in the end portion of the pixel array unit 103 and starting the light emission period.

At time t13, the light emission control signal PSW in the central portion of the pixel array unit 103 transitions from the high level to the low level, thereby turning on the light emission control transistor 204 in the central portion of the pixel array unit 103 and starting the light emission period.

If the start timing of the light emission period in the end portion of the pixel array unit 103 greatly differs from the start timing of the light emission period in the central portion of the pixel array unit 103, there is a possibility that uniformity between the end portion and the central portion in the screen cannot be ensured. Therefore, in the present exemplary embodiment, the unit for inclining a falling edge of the light emission control signal PSW is provided.

For example, in the control signal output circuit 302 illustrated in FIG. 4, the provision of the resistor element 304 at a subsequent stage of the output buffer 303 makes it possible to incline both a rising edge and a falling edge of the light emission control signal PSW.

Thus, the difference in the slope of the falling edge of the waveform of the light emission control signal PSW between the end portion and the central portion of the pixel array unit 103 is reduced to thereby prevent the start timing of the light emission period in the end portion of the pixel array unit 103 from being greatly different from the start timing of the light emission period in the central portion of the pixel array unit 103.

The light-emitting device 101 according to a third exemplary embodiment will be described with reference to FIG. 8. While in the first exemplary embodiment described above, an example where transistors constituting the buffer included in the vertical scanning circuit 104 are used to incline the waveform is described, the third exemplary embodiment is a modified example. Specifically, in the third exemplary embodiment, a configuration in which a resistor element 601 is located between the p-type transistor 403 of the output buffer 303 and an output terminal 602 to supply the control signal to the scanning line in a state where the rising edge of the waveform of the control signal is inclined will be described.

Figure 8:
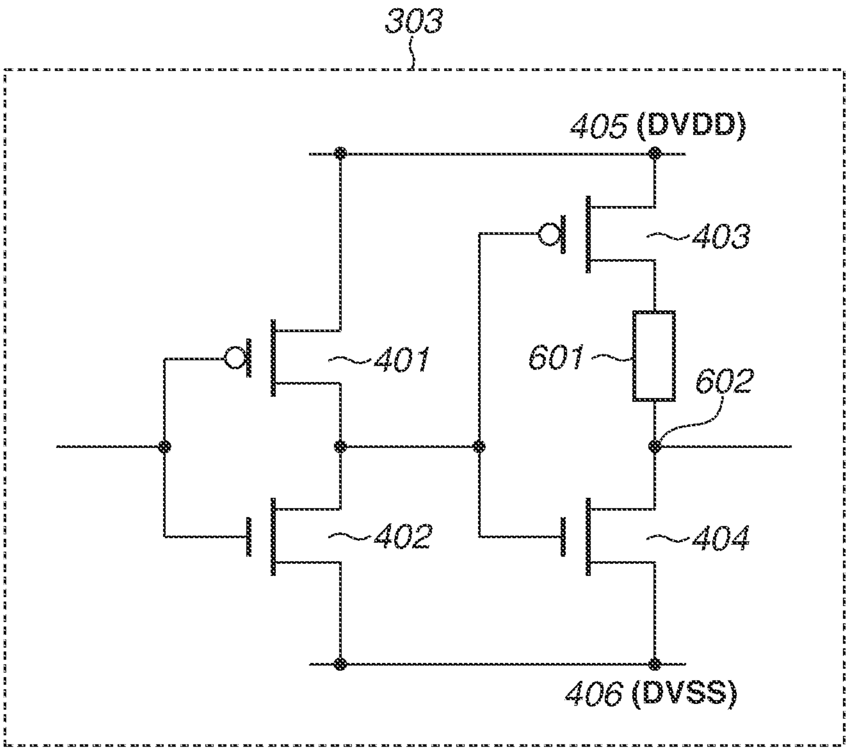
FIG. 8 illustrates a configuration example of an output buffer according to a third exemplary embodiment.

FIG. 8 is a circuit diagram illustrating a configuration example of the output buffer 303 according to the present exemplary embodiment. The resistor element 601 is located between the p-type transistor 403 and the output terminal 602. The output terminal 602 is supplied with the output signal from the output buffer 302. The provision of the resistor element 601 makes it possible to supply a waveform with a large delay amount in a rising edge in the end portion of the pixel array unit 103 in advance, unlike in the case where the resistor element 601 is not provided. As a result, the adverse effect of an increase in the delay amount due to an increase in the wiring length L is relatively decreased, so that variations in the slope of the rising edge of the waveform generated in the propagation process can be reduced. Therefore, the difference in the slope of the rising edge of the waveform between the end portion and the central portion of the pixel array unit 103 can be reduced.

In the light-emitting device 101, the driving force and the resistor element 601 of the output buffer 303 and the load resistance and the load capacitance of the scanning line may be different for each light-emitting device due to manufacturing variations. The threshold correction period varies even when the slope of the rising edge or the falling edge of the write control signal PSEL is optimized to set the same threshold correction period in the end portion and the central portion of the pixel array unit 103.

Accordingly, the resistor element 601 may be provided with a plurality of elements with different resistance values, and may be configured to select a certain resistance value from among the plurality of resistance values.

Supplying the light emission control signal PSW to the scanning line in a state where the rising edge of the waveform of the light emission control signal PSW is inclined makes it possible to reduce variations in the slope of the rising edge of the waveform generated in the propagation process. Thus, the difference in the slope of the rising edge of the light emission control signal PWS between the end portion and the central portion of the pixel array unit 103 can be reduced. This configuration makes it possible to reduce the difference in the period from the rising edge of the light emission control signal PWS to the rising edge of the write control signal PSEL, that is, the threshold correction period, between the end portion and the central portion of the pixel array unit 103. Consequently, the difference in the voltage between the gate and the source of the drive transistor 202 between the end portion and the central portion of the pixel array unit 103 can be reduced, so that uniform light emission of the organic light-emitting element 201 can be achieved.

In the configuration example illustrated in FIG. 8, the provision of the resistor element 601 between the n-type transistor 404 and the output terminal 602 makes it possible to incline the falling edge of the waveform of the light emission control signal PSW. With this configuration, the start timing of the light emission period in the end portion of the pixel array unit 103 can be prevented from being greatly different from the start timing of the light emission period in the central portion of the pixel array unit 103.

(Modified Example)

While in the exemplary embodiments described above, an example is described where the drive transistor 202 is connected to the anode of the organic light-emitting element 201 and all transistors are p-type transistors, the light-emitting device 101 according to the present exemplary embodiment is not limited to this example. All polarities and all conductivity types may be reversed. The drive transistor 202 may be a p-type transistor, and the other transistors may be n-type transistors. A potential to be supplied and a connection configuration may be changed, as needed, depending on the conductivity type and the polarity.

In a fourth exemplary embodiment, an example of a display device including an organic light-emitting element and a transistor connected to the organic light-emitting element will be described. The transistor is an example of an active element. A thin-film transistor (TFT) will be described below as an example of the transistor, but instead a metal-oxide semiconductor (MOS) transistor may be used.

Figure 9A:
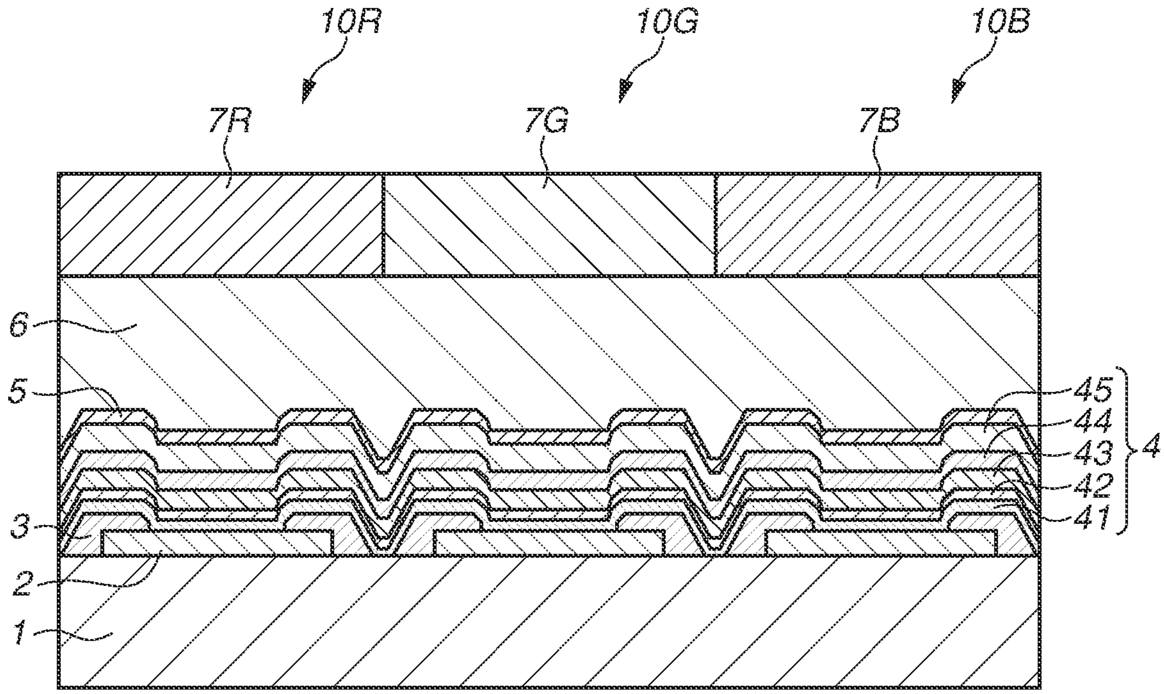
FIGS. 9A and 9B are schematic sectional views illustrating an example of a pixel of a light-emitting device according to a fourth exemplary embodiment.

FIG. 9A illustrates an example of a pixel as a constituent element of the display device according to the present exemplary embodiment. The pixel includes sub-pixels 10. The sub-pixels 10 are divided into sub-pixels 10R, 10G, and 10B depending on the light emission colors. The light emission colors may be distinguished based on a wavelength emitted from the light-emitting layer. Alternatively, light output from the sub-pixels 10 may be subjected to selective transmission or color conversion using a color filter or the like. Each sub-pixel 10 includes a reflective electrode 2 as a first electrode on an interlayer insulating layer 1, an insulating layer 3 covering ends of the reflective electrode 2, organic compound layers 4 covering the first electrode and the insulating layer, a second electrode 5 (transparent electrode 5), a protective layer 6, and a color filter 7.

A transistor and a capacitor element may be provided under or inside the interlayer insulating layer 1.

The transistor and the first electrode may be electrically connected via a contact hole or the like (not illustrated).

The insulating layer 3 is also referred to as a bank or a pixel separation film. The insulating layer 3 covers the ends of the first electrode and surrounds the first electrode. A portion of the first electrode not covered with the insulating layer is in contact with the organic compound layers 4 and functions as a light-emitting region.

The organic compound layers 4 include a hole injection layer 41, a hole transport layer 42, a first light-emitting layer 43, a second light-emitting layer 44, and an electron transport layer 45.

The second electrode 5 may be a transparent electrode, a reflective electrode, or a semitransparent electrode.

The protective layer 6 reduces the penetration of moisture into the organic compound layers 4. The protective layer 6 is illustrated as a single layer but may be include a plurality of layers. Each of the plurality of layers may include an inorganic compound layer and an organic compound layer.

The color filter 7 is divided into color filters 7R, 7G, and 7B according to the color. The color filters 7 may be formed on a planarization film (not illustrated). A resin protective layer (not illustrated) may be provided on the color filter 7. The color filter 7 may be formed on the protective layer 6. Alternatively, the color filter 7 may be provided on an opposite substrate such as a glass substrate and then bonded.

Figure 9B:
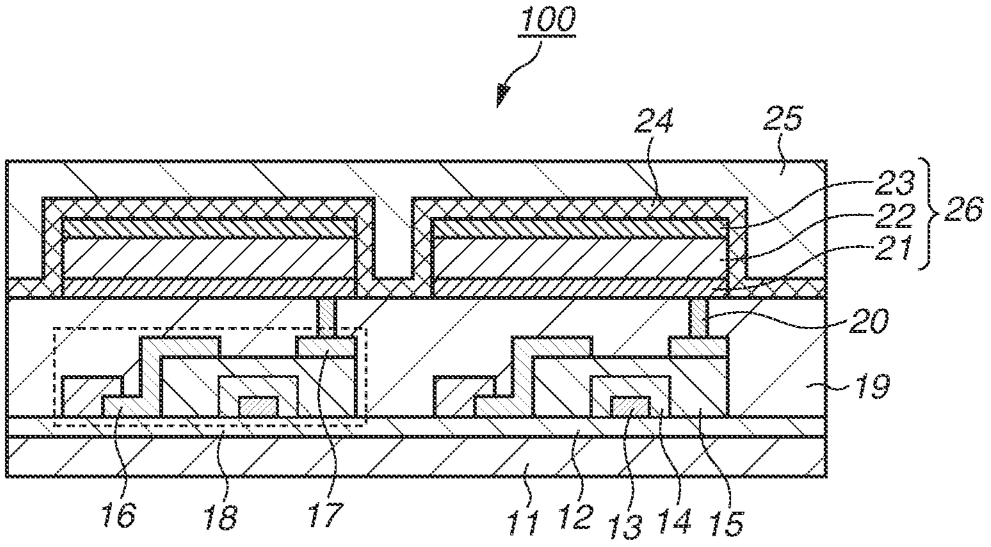

A display device 100 illustrated in FIG. 9B includes an organic light-emitting element 26 and a thin-film transistor (TFT) 18 as an example of a transistor. The display device 100 includes a substrate 11 made of glass, silicon, or the like, and an insulating layer 12 on the substrate 11. The display device 100 also includes, on the insulating layer 12, an active element (e.g., TFT) 18, a gate electrode 13 of the active element 18, a gate insulating film 14, and a semiconductor layer 15. The TFT 18 is composed of the semiconductor layer 15, a drain electrode 16, and a source electrode 17. An insulation film 19 is provided on the TFT 18. An anode 21 included in the organic light-emitting element 26 and the source electrode 17 are connected via a contact hole 20 formed in the insulation film 19.

Electrical connection between electrodes (anode, cathode) included in the organic light-emitting element 26 and electrodes (source electrode, drain electrode) included in the TFT is not limited to that illustrated in FIG. 9B. Specifically, one of the anode and the cathode and one of the source electrode and the drain electrode of the TFT may be electrically connected.

Although an organic compound layer 22 is illustrated as a single layer in the display device 100 illustrated in FIG. 9B, the organic compound layer 22 may be include a plurality of layers. A first protective layer 24 and a second protective layer 25 for reducing degradation of the organic light-emitting element 26 are provided on the cathode 23.

The transistor used as a switching element in the display device 100 illustrated in FIG. 9B may be replaced with another switching element.

The transistor used in the display device 100 illustrated in FIG. 9B is not limited to a transistor using a single crystal silicon wafer and may also be a thin-film transistor including an active layer on an insulating surface of a substrate. The active layer may be single-crystal silicon, non-single-crystal silicon, such as amorphous silicon or microcrystalline silicon, or a non-single-crystal oxide semiconductor, such as indium zinc oxide or indium gallium zinc oxide. The thin-film transistor is also referred to as a TFT element.

The transistor included in the display device 100 illustrated in FIG. 9B may be formed within a substrate such as a silicon (Si) substrate. In other words, the transistor may be a MOS transistor.

The light emission luminance of the organic light-emitting element 26 according to the present exemplary embodiment is controlled by the TFT, which is an example of a switching element, and the organic light-emitting element 26 can be provided on a plurality of planes to display an image at each light emission luminance. The switching element according to the present exemplary embodiment is not limited to the TFT and may be a transistor formed of low-temperature polysilicon or an active-matrix driver formed on a substrate, such as a Si substrate. The phrase "on a substrate" may also indicate "within a substrate". Whether a transistor is provided within a substrate or a TFT is used depends on the size of a display unit. For example, for an approximately 0.5-inch display unit, an organic light-emitting element may be desirably provided on a Si substrate.

Figure 10:
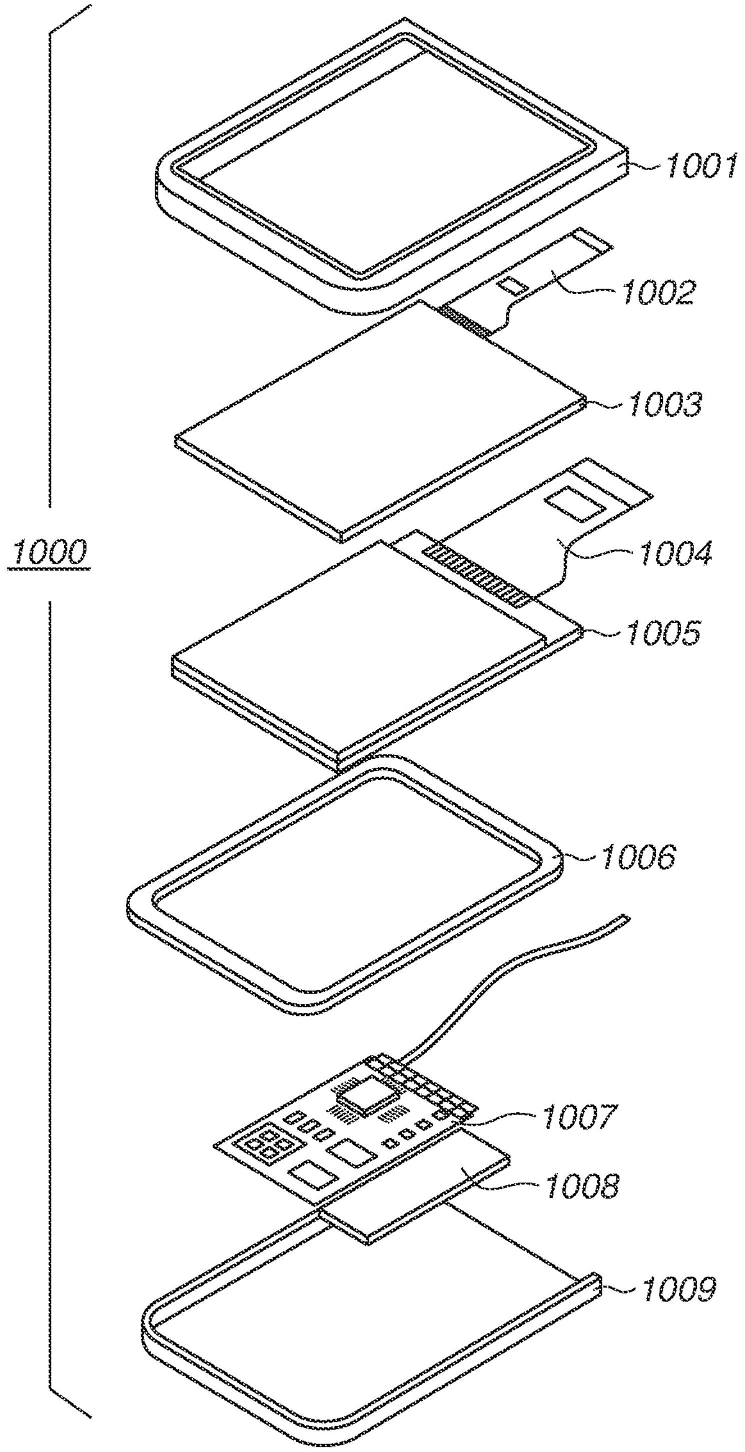
FIG. 10 is a schematic view illustrating an example of a light-emitting device according to a fifth exemplary embodiment.

FIG. 10 is a schematic view illustrating an example of a display device according to a fifth exemplary embodiment. A display device 1000 may include a touch panel 1003, a display panel 1005, a frame 1006, a circuit board 1007, and a battery 1008 between an upper cover 1001 and a lower cover 1009. The touch panel 1003 and the display panel 1005 are connected to flexible printed circuits (FPCs) 1002 and 1004, respectively. Transistors are printed on the circuit board 1007. The battery 1008 may not be provided when the display device is not a mobile device, or may be provided at another position when the display device is a mobile device.

The display device 1000 according to the present exemplary embodiment may include color filters of red, green, and blue colors. The red, green, and blue color filters may be arranged in a delta arrangement.

The display device 1000 according to the present exemplary embodiment may be used for a display unit of a mobile terminal. In this case, the display device 1000 may have both a display function and an operation function. Examples of the mobile terminal include a mobile phone such as a smartphone, a tablet, and a head-mounted display (HMD).

The display device 1000 according to the present exemplary embodiment may be used for a display unit of an image capturing device including an optical unit including a plurality of lenses, and an image sensor configured to receive light that has passed through the optical unit. The image capturing device may include a display unit for displaying information obtained by the image sensor. The display unit may be a display unit exposed to the outside of the image capturing device, or may be a display unit located within a finder. The image capturing device may be a digital camera or a digital video camera.

Figure 11A:
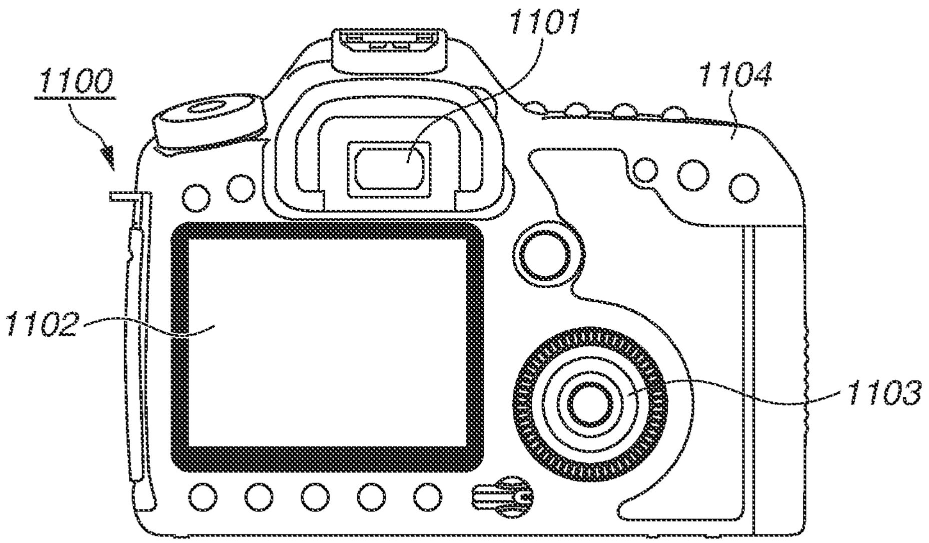
FIG. 11A is a schematic view of an image capturing device according to a sixth exemplary embodiment.

FIG. 11A is a schematic view illustrating an example of an image capturing device according to a sixth exemplary embodiment. An image capturing device 1100 may include a viewfinder 1101, a rear display 1102, an operation unit 1103, and a casing 1104. The viewfinder 1101 may include the display device according to the exemplary embodiments described above. In this case, the display device may display not only captured images, but also environmental information, image capturing instructions, and the like. The environmental information may include the intensity and direction of external light, the moving speed of an object, and the possibility that an object is shielded by an obstacle.

Because the appropriate timing for image capturing is a short time, it may be desirable to display information as soon as possible. Therefore, a display device incorporating the organic light-emitting element according to the disclosure can be desirably used. This is because the organic light-emitting element has a high response speed. A display device incorporating the organic light-emitting element can be more suitably used than these devices and liquid crystal display devices that require a high display speed.

The image capturing device 1100 includes an optical unit (not illustrated). The optical unit includes a plurality of lenses and focuses an image on an image sensor accommodated in the casing 1104. The focus of the lenses can be adjusted by adjusting their relative positions. This operation can also be automatically performed. The image capturing device may also be referred to as a photoelectric conversion device. The photoelectric conversion device can employ, as an image capturing method, a method of detecting a difference from a previous image or a method of cutting out an image from a constantly recorded image, instead of sequentially capturing images.

Figure 11B:
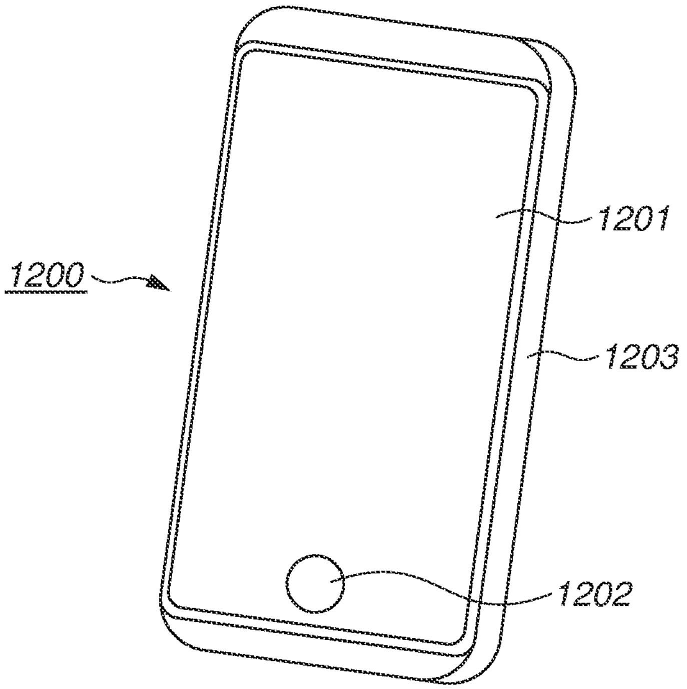
FIG. 11B is a schematic view of an electronic apparatus according to the sixth exemplary embodiment.

FIG. 11B is a schematic view illustrating an example of an electronic apparatus according to the present exemplary embodiment. An electronic apparatus 1200 includes a display unit 1201, an operation unit 1202, and a casing 1203. The casing 1203 may include a circuit, a printed board including the circuit, a battery, and a communication unit. The operation unit 1202 may be a button or a touch panel response unit. The operation unit 1202 may be a biometric recognition unit configured to, for example, recognize a fingerprint and release the lock. The electronic apparatus including a communication unit may also be referred to as a communication apparatus. The electronic apparatus may include a lens and an image sensor and thus may further have a camera function. An image captured by the camera function is displayed on the display unit 1201. Examples of the electronic apparatus may include a smartphone and a personal computer (PC).

Figure 12A:
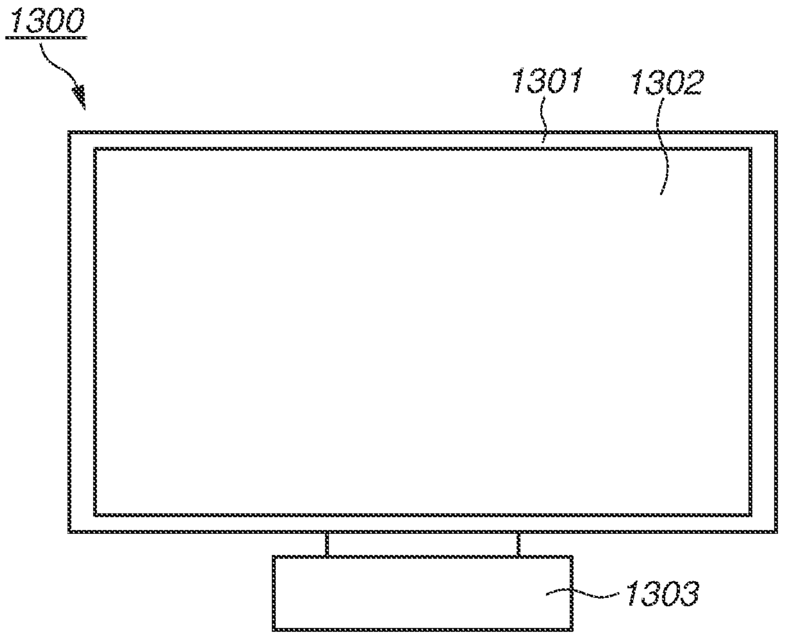
FIGS. 12A and 12B are schematic views each illustrating a display device according to a seventh exemplary embodiment.
Figure 12B:
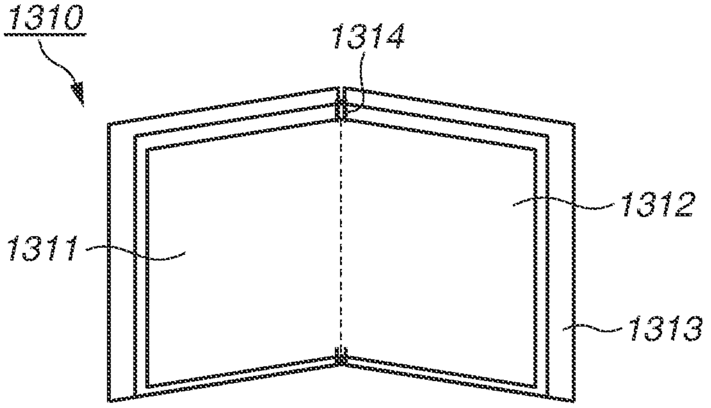

FIGS. 12A and 12B are schematic views each illustrating an example of a display device according to a seventh exemplary embodiment. FIG. 12A illustrates an example of the display device such as a television monitor or a PC monitor. A display device 1300 includes a frame 1301 and a display unit 1302. The light-emitting device according to the exemplary embodiments described above may be used for the display unit 1302.

The display device 1300 further includes a base 1303 that supports the frame 1301 and the display unit 1302. The base 1303 is not limited to the configuration illustrated in FIG. 12A. The lower side of the frame 1301 may function as the base 1303.

The frame 1301 and the display unit 1302 may be bent. The radius of curvature may range from 5000 mm to 6000 mm.

FIG. 12B is a schematic view illustrating another example of the display device according to the present exemplary embodiment. A display device 1310 illustrated in FIG. 12B is configured to be bent, and thus is a so-called foldable display device. The display device 1310 includes a first display unit 1311, a second display unit 1312, a casing 1313, and a bending point 1314. The first display unit 1311 and the second display unit 1312 may include the light-emitting device according to the exemplary embodiments described above. The first display unit 1311 and the second display unit 1312 may be formed as a single display device with no joint. The first display unit 1311 and the second display unit 1312 can be divided at the bending point 1314. The first display unit 1311 and the second display unit 1312 may display different images, or may display a single image.

Figure 13A:
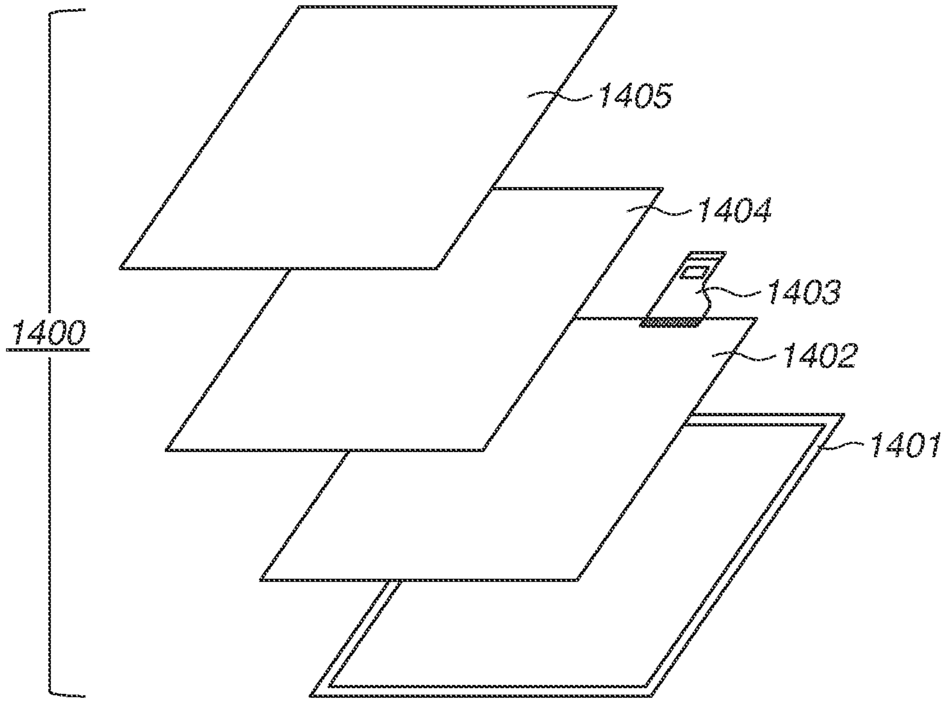
FIG. 13A is a schematic view illustrating an example of a lighting device according to an eighth exemplary embodiment.

FIG. 13A is a schematic view illustrating an example of a lighting device according to an eighth exemplary embodiment. A lighting device 1400 may include a casing 1401, a light source 1402, a circuit board 1403, an optical film 1404, and a light diffusion portion 1405. The light source 1402 may include the organic light-emitting element according to the exemplary embodiments described above. The optical film 1404 may be a film for enhancing the color rendering properties of the light source 1402. The light diffusion portion 1405 is configured to effectively diffuse light from the light source 1402 by, for example, lighting up, to allow the light to spread in a wide range. The optical film 1404 and the light diffusion portion 1405 may be provided on a light output side of the lighting device 1400. A cover may be provided on an outermost portion of the lighting device 1400, if necessary.

The lighting device 1400 is, for example, a device that illuminates a room. The lighting device 1400 may be configured to emit light of colors including white, neutral white color, and any of the other colors from blue to red. The lighting device 1400 may include a dimmer circuit for controlling the light.

The lighting device 1400 may include the organic light-emitting element according to disclosure and a power supply circuit connected to the organic light-emitting element. The power supply circuit is a circuit for converting an alternating-current (AC) voltage into a direct-current (DC) voltage. White color has a color temperature of 4200 K, and neutral white color has a color temperature of 5000 K. The lighting device 1400 may also include a color filter.

The lighting device 1400 according to the present exemplary embodiment may also include a heat radiation portion. The heat radiation portion radiates heat within the device to the outside of the device, and is made of metal with high specific heat, liquid silicon, or the like.

Figure 13B:
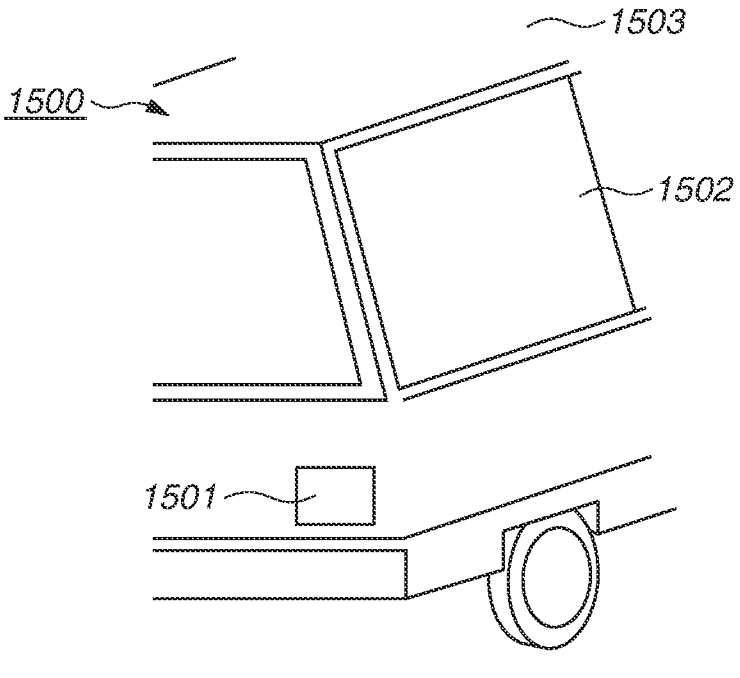
FIG. 13B is a schematic view illustrating an example of an automobile including a vehicle lighting fixture.

FIG. 13B is a schematic view illustrating an automobile as an example of a moving body according to the present exemplary embodiment. The automobile includes a tail lamp as an example of a lighting fixture. An automobile 1500 may include a tail lamp 1501 and may be configured to turn on the tail lamp 1501 when a braking operation or the like is performed.

The tail lamp 1501 may include the organic light-emitting element according to the exemplary embodiments described above. The tail lamp 1501 may include a protective member for protecting an organic electroluminescence (EL) element. The protective member may have a certain level of strength. The material of the protective member is not particularly limited, as long as the protective member is transparent. However, the protective member may be desirably made of polycarbonate or the like. The polycarbonate may be mixed with, for example, a furandicarboxylic acid derivative or an acrylonitrile derivative.

The automobile 1500 may include a vehicle body 1503 and windows 1502 attached to the vehicle body 1503. The windows 1502 may be a transparent display, if the windows 1502 are not used to check the front and back sides of the automobile 1500. The transparent display may include the organic light-emitting element according to the exemplary embodiments described above. In this case, the material forming electrodes and the like included in the organic light-emitting element may be a transparent material.

The moving body according to the present exemplary embodiment may be a ship, an aircraft, a drone, or the like. The moving body may include a body and a lighting fixture provided on the body. The lighting fixture may be configured to emit light to notify a user of the position of the body. The lighting fixture includes the organic light-emitting element according to the exemplary embodiments described above.

Application examples of the display device according to the exemplary embodiments described above will be described with reference to FIGS. 14A and 14B. The display device can be applied to a system that can be worn as a wearable device, such as smart glasses, a HMD, or smart contact lenses. An image capturing display device used for such application examples includes an image capturing device configured to photoelectrically convert visible light, and a display device configured to emit visible light.

Figure 14A:
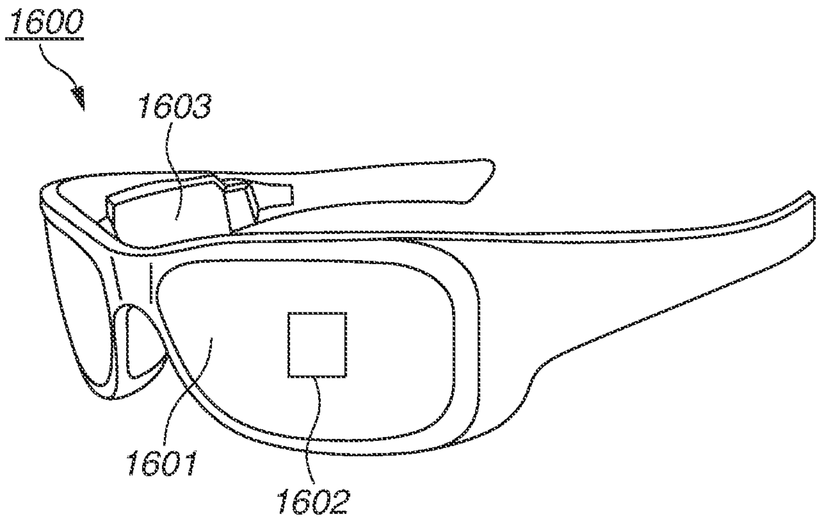
FIGS. 14A and 14B are schematic views each illustrating an example of a wearable device according to a ninth exemplary embodiment.

FIG. 14A illustrates eyeglasses 1600 (smart glasses) according to one of the application examples. On the front surface of each lens 1601 of the eyeglasses 1600, an image capturing device 1602 such as a complementary metal-oxide-semiconductor (CMOS) sensor or a single-photon avalanche diode (SPAD) sensor is provided. On the back surface of each lens 1601, the display device according to the exemplary embodiments described above is provided.

The eyeglasses 1600 further include a control device 1603. The control device 1603 functions as a power supply to supply power to each of the image capturing device 1602 and the display device according to the exemplary embodiments. The control device 1603 controls the operations of the image capturing device 1602 and the display device. Each lens 1601 is provided with an optical system for focusing light on the image capturing device 1602.

Figure 14B:
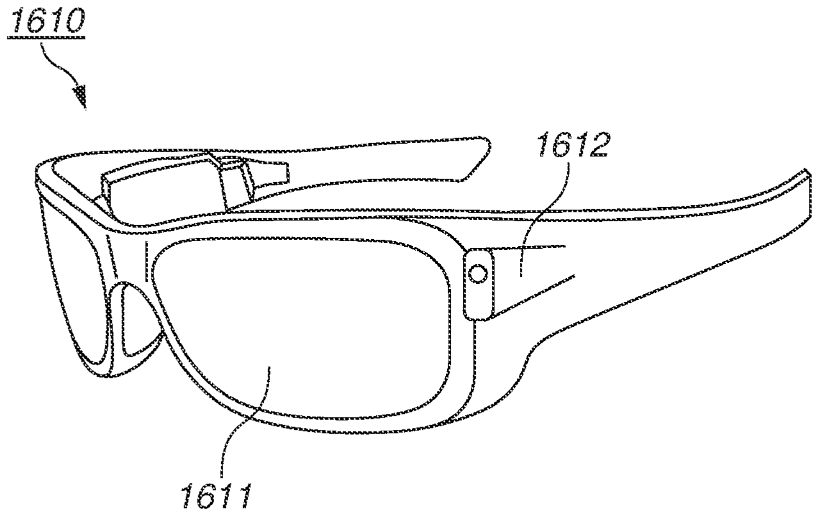

FIG. 14B is a schematic view of eyeglasses 1610 (smart glasses) according to another application example. The eyeglasses 1610 include a control device 1612. An image capturing device corresponding to the image capturing device 1602 and a display device are mounted on the control device 1612. Each lens 1611 is provided with an optical system for projecting light emitted from the image capturing device and the display device included in the control device 1612. An image is projected on each lens 1611. The control device 1612 functions as a power supply to supply power to each of the image capturing device and the display device, and controls the operations of the image capturing device and the display device. The control device may include a line-of-sight detection unit for detecting the line of sight of a wearer. The line of sight may be detected using infrared rays. An infrared light emission unit emits infrared light to the eyeballs of the user gazing at a display image. Reflected light of the emitted infrared light from the eyeballs is detected by an image capturing unit including a light-receiving element, and thus captured images of the eyeballs can be obtained. A reduction unit configured to reduce light from the infrared light emission unit to the display unit in plan view is provided to reduce the deterioration in image quality.

The line of sight of the user on the display image is detected from the captured images of the eyeballs obtained by capturing images of infrared light. Any known method can be applied to detect the line of sight using captured images of the eyeballs of the user. For example, a line-of-sight detection method based on Purkinje images formed by reflections of illumination light from corneas can be used.

More specifically, line-of-sight detection processing based on a pupil-corneal reflection method is performed. A line-of-sight vector representing the orientation (rotational angle) of an eyeball is calculated using the pupil-corneal reflection method based on pupil images included in captured images of the eyeballs and Purkinje images, thereby detecting the line of sight of the user.

The display device according to an exemplary embodiment may include an image capturing device including a light-receiving element, and may control a display image on the display device based on information about the line of sight of the user received from the image capturing device.

Specifically, the display device determines a first field-of-view region at which the user gazes, and a second field-of-view region other than the first field-of-view region based on the line-of-sight information. The first field-of-view region and the second field-of-view region may be determined by a control device of the display device, or the first field-of-view region and the second field-of-view region that are determined by an external control device may be received. In a display region of the display device, the display resolution for the first field-of-view region may be controlled to be higher than the display resolution for the second field-of-view region. In other words, the resolution for the second field-of-view region may be set to be lower than the resolution for the first field-of-view region.

The display region includes a first display region and a second display region different from the first display region. One of the first display region and the second display region with higher priority is determined based on the line-of-sight information. The first display region and the second display region may be determined by the control device of the display device, or the first display region and the second display region that are determined by an external control device may be received. The resolution for the region with higher priority may be controlled to be higher than the resolution for a region other than the region with higher priority. In other words, the resolution for the region with relatively low priority may be set to be lower than the resolution for the region with higher priority.

A technique using artificial intelligence (AI) may be used to determine the first field-of-view region or the region with higher priority. The AI may be a model configured to estimate an angle of a line of sight and a distance to an object indicated by the line of sight based on eyeball images using the eyeball images and the direction in which the eyeballs are actually directed as training data. An AI program may be included in the display device, the image capturing device, or an external device. If the AI program is included in an external device, the AI program is transmitted to the display device via communication.

In the case of performing display control based on visual recognition detection, the present exemplary embodiment can be suitably applied to smart glasses further including an image capturing device for capturing an image of an outside. The smart glasses are configured to display captured external information in real time.

(Others)

The elements in the above-described exemplary embodiments can be arbitrarily combined with each other.

According to an aspect of the disclosure, it is possible to provide a technique that is advantageous in ensuring uniformity in a screen.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-063431, filed Apr. 10, 2023, which is hereby incorporated by reference herein in its entirety.

What is claimed is:

1. A light-emitting device including a plurality of light-emitting elements and a plurality of pixel circuits, the plurality of pixel circuits each including:
- a drive transistor configured to drive a corresponding one of the plurality of light-emitting elements;
- a write transistor configured to write a signal to a gate of the drive transistor; and
- a light emission control transistor configured to control connection between the gate of the drive transistor and a power supply, the light-emitting device comprising:
- a first control line for controlling the write transistor;
- a second control line for controlling the light emission control transistor;
- a first circuit configured to incline a signal waveform of the first control line; and
- a second circuit configured to incline a signal waveform of the second control line,
- wherein the second circuit inclines a waveform to turn off the light emission control transistor, and the first circuit inclines a waveform to turn off the write transistor,
- wherein at a first time, the light emission control transistor is turned on while the write transistor is maintained in an ON state,
- wherein at a second time after the first time, the light emission control transistor is turned off while the write transistor is maintained in the ON state, and
- wherein at a third time after the second time, the write transistor is turned off while the light emission control transistor is maintained in an OFF state.

2. The light-emitting device according to claim 1, wherein the second circuit inclines a waveform to turn on the light emission control transistor.

3. The light-emitting device according to claim 1, wherein the second circuit makes a slope of the waveform to turn off the light emission control transistor gentler than a slope of a waveform to turn on the light emission control transistor.

4. The light-emitting device according to claim 3, wherein the slope of the waveform leans toward for at most 15% of a period.

5. The light-emitting device according to claim 1, wherein the first circuit inclines a waveform to turn on the write transistor.

6. The light-emitting device according to claim 1, further comprising a scanning circuit configured to supply a signal to each of the first control line and the second control line,
- wherein the scanning circuit is provided with a buffer configured to output the signal.

7. The light-emitting device according to claim 6, further comprising a resistor element located at a subsequent stage of the buffer,
- wherein the resistor element functions as the second circuit.

8. The light-emitting device according to claim 6,
- wherein the buffer includes a transistor of a first conductivity type and a transistor of a second conductivity type different from the first conductivity type, and
- wherein an on-resistance of the transistor of the first conductivity type is different from an on-resistance of the transistor of the second conductivity type.

9. The light-emitting device according to claim 8,
- wherein the transistor of the first conductivity type is a p-type transistor,
- wherein the transistor of the second conductivity type is an n-type transistor, and
- wherein the on-resistance of the transistor of the first conductivity type is higher than the on-resistance of the transistor of the second conductivity type.

10. A photoelectric conversion device comprising:
- an optical unit including a plurality of lenses;
- an image sensor configured to receive light having passed through the optical unit; and
- a display unit configured to display an image captured by the image sensor,
- wherein the display unit includes the light-emitting device according to claim 1.

11. An electronic apparatus comprising:
- a display unit including the light-emitting device according to claim 1;
- a casing in which the display unit is provided; and
- a communication unit configured to communicate with an external apparatus, the communication unit being provided in the casing.

12. A lighting device comprising:
- a light source including the light-emitting device according to claim 1; and
- one of a light diffusion portion and an optical film configured to pass light emitted from the light source.

13. A moving body comprising:
- a lighting fixture including the light-emitting device according to claim 1; and
- a body provided with the lighting fixture.

14. A light-emitting device including a plurality of light-emitting elements and a plurality of pixel circuits, the plurality of pixel circuits each including:
- a drive transistor configured to drive a corresponding one of the plurality of light-emitting elements;
- a write transistor configured to write a signal to a gate of the drive transistor; and
- a light emission control transistor configured to control connection between the gate of the drive transistor and a power supply, the light-emitting device comprising:
- a first control line for controlling the write transistor;
- a second control line for controlling the light emission control transistor;

a first circuit configured to incline a signal waveform of the first control line; and a second circuit configured to incline a signal waveform of the second control line; and a scanning circuit configured to supply a signal to each of the first control line and the second control line, wherein the second circuit inclines a waveform to turn off the light emission control transistor, and the first circuit inclines a waveform to turn off the write transistor, wherein the scanning circuit is provided with a buffer configured to output the signal, wherein a resistor element is located at a subsequent stage of the buffer, and wherein the resistor element functions as the second circuit.

15. The light-emitting device according to claim 14, wherein the second circuit inclines a waveform to turn on the light emission control transistor.

16. The light-emitting device according to claim 14, wherein the second circuit makes a slope of the waveform to turn off the light emission control transistor gentler than a slope of a waveform to turn on the light emission control transistor.

17. A light-emitting device including a plurality of light-emitting elements and a plurality of pixel circuits, the plurality of pixel circuits each including:

a drive transistor configured to drive a corresponding one of the plurality of light-emitting elements;

a write transistor configured to write a signal to a gate of the drive transistor; and a light emission control transistor configured to control connection between the gate of the drive transistor and a power supply, the light-emitting device comprising:

a first control line for controlling the write transistor;

a second control line for controlling the light emission control transistor;

a first circuit configured to incline a signal waveform of the first control line;

a second circuit configured to incline a signal waveform of the second control line; and a scanning circuit configured to supply a signal to each of the first control line and the second control line, wherein the second circuit inclines a waveform to turn off the light emission control transistor, and the first circuit inclines a waveform to turn off the write transistor, wherein the scanning circuit is provided with a buffer configured to output the signal, wherein a resistor element is located at a subsequent stage of the buffer, and wherein the resistor element functions as the second circuit.

18. The light-emitting device according to claim 17, wherein the second circuit inclines a waveform to turn on the light emission control transistor.

19. The light-emitting device according to claim 17, wherein the second circuit makes a slope of the waveform to turn off the light emission control transistor gentler than a slope of a waveform to turn on the light emission control transistor.

* * * * *